US012550281B2

(12) United States Patent
Chen et al.

(10) Patent No.: US 12,550,281 B2
(45) Date of Patent: Feb. 10, 2026

(54) RISER CARD FOR A VERTICAL MOUNTING OF AN EXPANSION CARD

(71) Applicant: HEWLETT PACKARD ENTERPRISE DEVELOPMENT LP, Spring, TX (US)

(72) Inventors: Kuan-Wei Chen, Taipei (TW); Chih-Wei Chiang, Taipei (TW); Chao-Ming Chang, Taipei (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 151 days.

(21) Appl. No.: 18/641,562

(22) Filed: Apr. 22, 2024

(65) Prior Publication Data

US 2025/0331118 A1    Oct. 23, 2025

(51) Int. Cl.
*H05K 7/14* (2006.01)
*G06F 1/18* (2006.01)

(52) U.S. Cl.
CPC .......... *H05K 7/1461* (2013.01); *G06F 1/183* (2013.01); *H05K 7/1424* (2013.01); *H05K 7/1489* (2013.01)

(58) Field of Classification Search
None
See application file for complete search history.

(56) References Cited

U.S. PATENT DOCUMENTS

| | | | | |
|---|---|---|---|---|
| 6,496,376 | B1 * | 12/2002 | Plunkett | H05K 7/1441 361/792 |
| 6,639,806 | B1 * | 10/2003 | Chuang | H05K 7/1429 361/752 |
| 8,365,403 | B2 | 2/2013 | Zhang et al. | |
| 11,360,527 | B2 | 6/2022 | Chang et al. | |
| 2002/0072255 | A1 * | 6/2002 | Leman | H01R 12/721 439/61 |

(Continued)

OTHER PUBLICATIONS

Amphenol Communications Solutions, "Solutions for OCP Related Applications," Oct. 2022, 44 pages.

(Continued)

*Primary Examiner* — James Wu
*Assistant Examiner* — Christopher L Augustin
(74) *Attorney, Agent, or Firm* — Hewlett Packard Enterprise Patent Department

(57) ABSTRACT

A riser card includes a circuit board and first, second, and third connectors. The first and second connectors are positioned at bottom and top edges of the circuit board, respectively. The third connector is mounted to a face of the circuit board. Such riser card may be mounted on a primary system board such that the first connector is detachably connected to a first complementary connector of the primary system board with the circuit board perpendicular to the primary system board, and the first connector receives power, data, and sideband signals from the first complementary connector. The second and third connectors may mate with second and third complementary connectors of an expansion card oriented parallel to the circuit board and a stackable secondary riser card oriented perpendicular to the circuit board, respectively. The riser card communicates power and sideband signals to the stackable secondary riser card via the third connector.

20 Claims, 15 Drawing Sheets

(56) References Cited

U.S. PATENT DOCUMENTS

2011/0149499 A1* 6/2011 Bandholz ................ G06F 1/185
 29/842

OTHER PUBLICATIONS

Feichao CNC, "PCLe 4.0 X4/X8 to X16 Riser Card Converter/X16 Slot PCI-E Gen 4 Extension Adapter Card for PC Graphics Cards," retrieved online Jun. 1, 2024, https://www.aliexpress.us/item/3256805148331206.html?gatewayAdapt=glo2usa4itemAdapt, 19 pages.

* cited by examiner

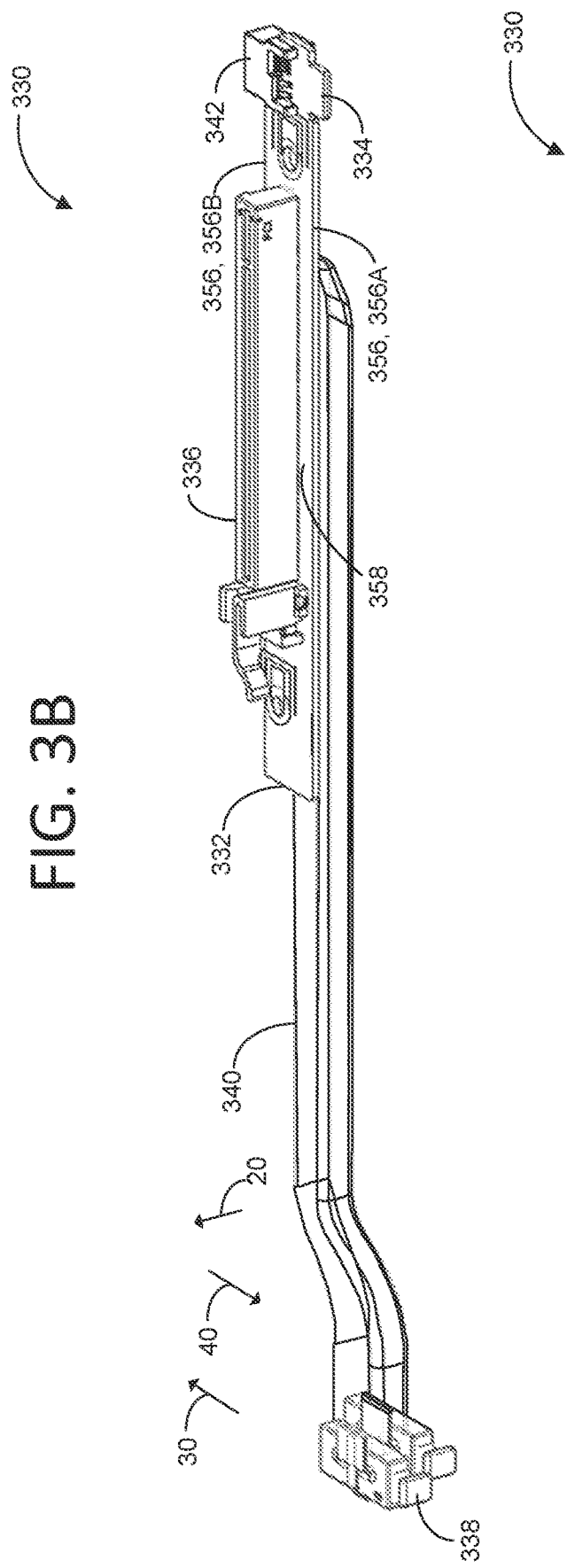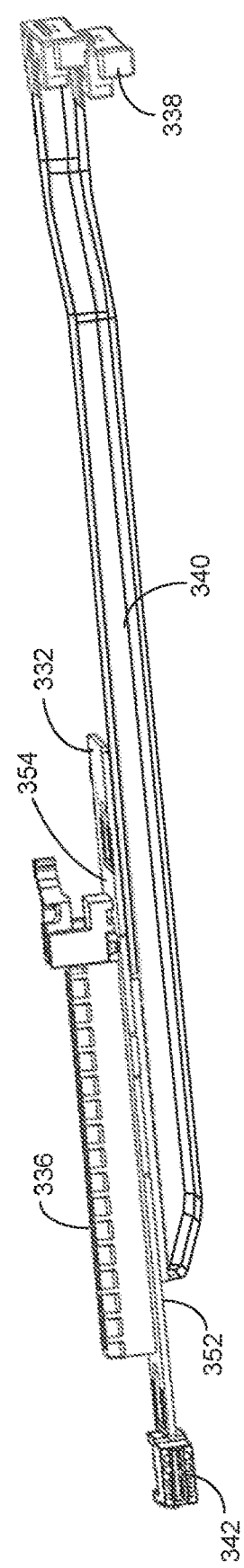

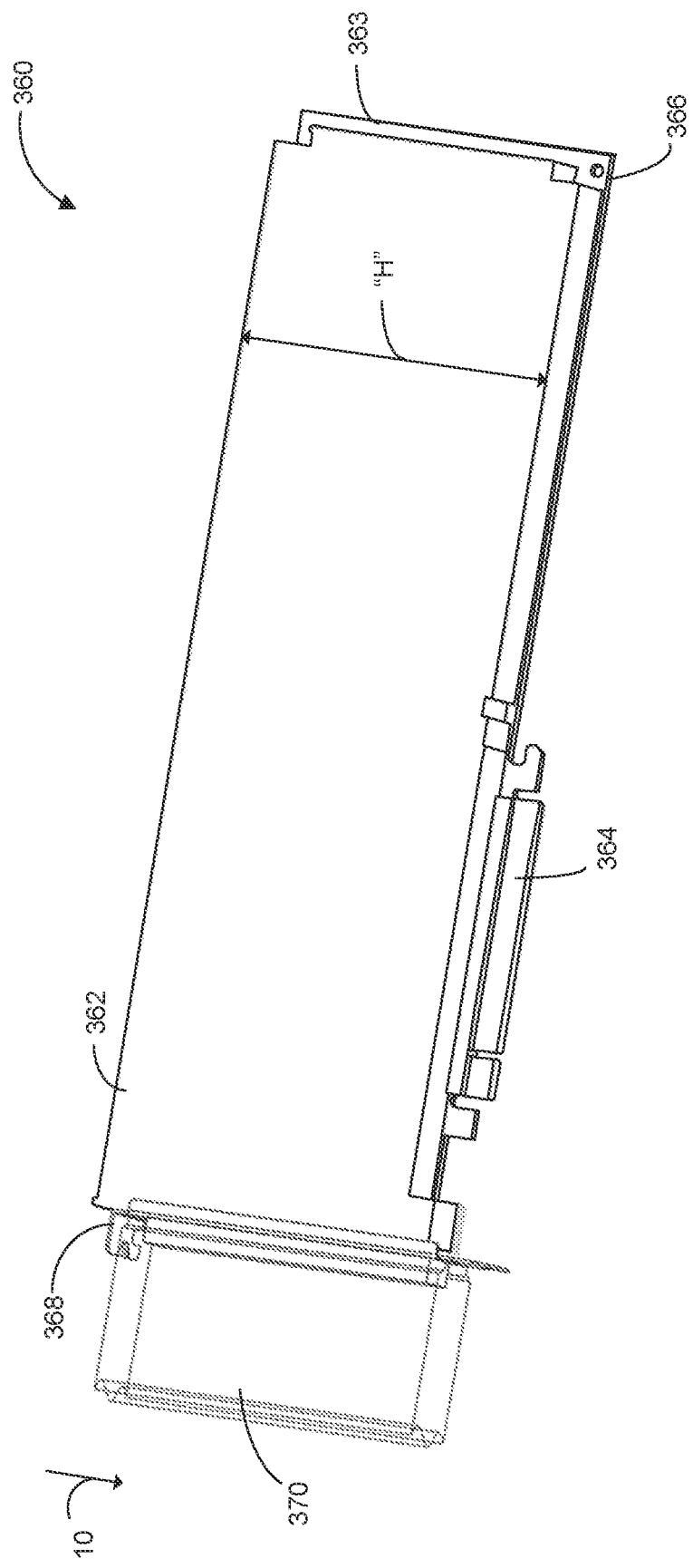

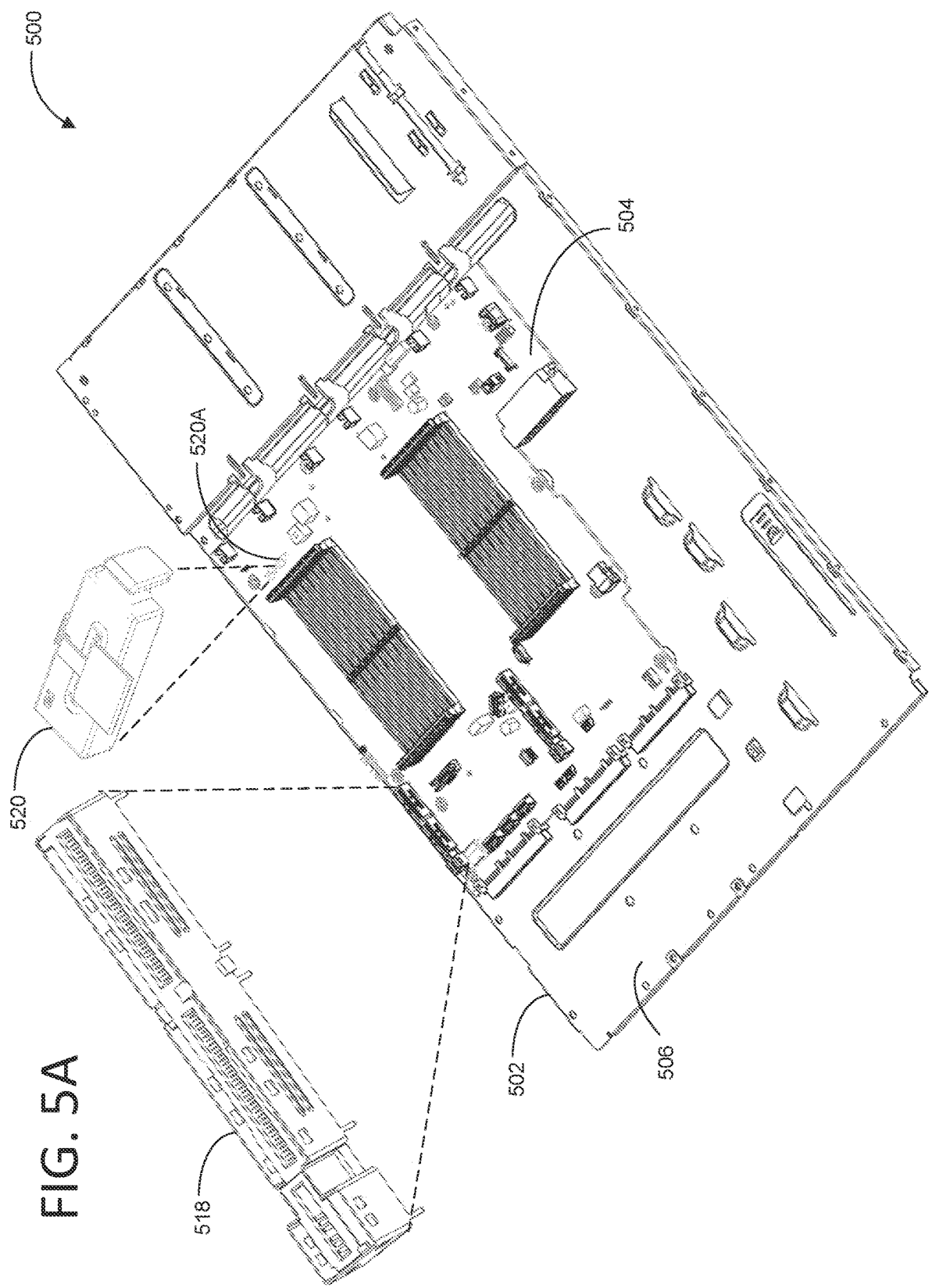

RISER CARD FOR A VERTICAL MOUNTING OF AN EXPANSION CARD

BACKGROUND

An information processing device such as a computer, a networking device, or the like may include a primary system board (e.g., a motherboard or a host processor module) having hardware components such as central processor units, resistors, capacitors, or the like to provide some basic function. In order to pursue stronger performance and/or expand functionality of the device, additional hardware components such as an expansion card (e.g., display card) may be coupled to the primary system board. In some information processing devices, the primary system board may include a connector (e.g., expansion slot) that can directly receive the expansion card. However, in other information processing devices, the primary system board may lack the appropriate number or type of connectors needed to receive desired expansion card(s), or the connectors may be present but in an inconvenient location, and thus in some information processing devices, another card (or intermediary card) which carries a connector that is suitable for the expansion card may be coupled to the primary system board, thus providing the needed connection point for the expansion card. Such an intermediary card is generally referred to as a riser card.

BRIEF DESCRIPTION OF THE DRAWINGS

Various examples will be described below with reference to the following figures.

FIG. 3B illustrates a perspective view of a stackable secondary riser card according to an example of the present disclosure.

FIG. 3C illustrates another perspective view of the stackable secondary riser card of FIG. 3B according to an example of the present disclosure.

FIG. 3D illustrates a perspective view of an expansion card according to an example of present disclosure.

FIG. 5A illustrates a perspective view of a portion of an information processing device having a chassis and a primary system board according to an example of the present disclosure.

DETAILED DESCRIPTION

Figure 1A:
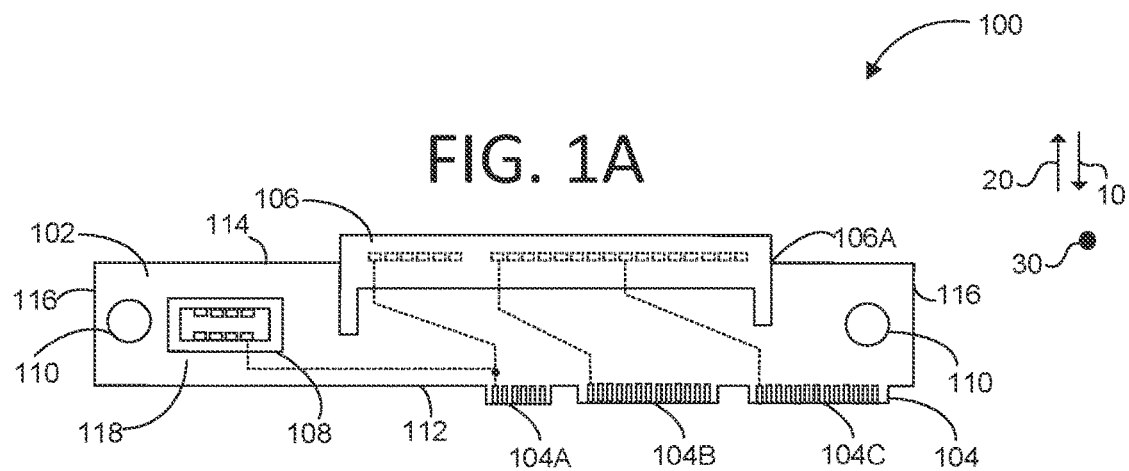
FIG. 1A illustrates a block diagram of a riser card according to an example of the present disclosure.

The following detailed description refers to the accompanying drawings. For purposes of explanation, certain examples are described with reference to the components illustrated in FIGS. 1-6. The functionality of the illustrated components may overlap, however, and may be present in a fewer or greater number of elements and components. Moreover, the disclosed examples may be implemented in various environments and are not limited to the illustrated examples. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The riser card is an electronic card including a circuit board and a plurality of connectors (e.g., electrical connectors). The circuit board of the riser card is configured to be coupled to a primary system board of an information processing device by removably connecting one of the connectors (e.g., a PCI-e edge connector) of the riser card to the expansion slot (e.g., the socket connector) of the primary system board to receive power signals, data signals, and sideband signals from the expansion slot. Further, another connector (e.g., a socket connector) of the riser card may be configured to removably receive a complementary connector (e.g., the PCI-e edge connector) of an expansion card such that the expansion card is electrically connected to the primary system board via the riser card.

A riser assembly includes a riser cage that is configured to support the riser card, and to further support the expansion card added to the information processing device. For example, the riser assembly is installed in the information processing device such that the riser cage is connected to a chassis and the riser card is electrically connected to the primary system board by removably connecting the PCI-e edge connector of the riser card to the expansion slot of the primary system board. The expansion card may be installed in the riser assembly such that the riser cage further supports the expansion card, and the expansion card is electrically connected to the riser card by removably connecting the PCI-e edge connector of the expansion card to the socket connector of the riser card, thus allowing the expansion card to be electrically connected to the primary system board via the riser card. Accordingly, when the expansion card is connected to the riser card, electrical signals from the expansion card may be transferred to the primary system board via the riser card. This may allow a type of connector that the primary system board lacks to be added, or the number of such connectors to be expanded, or the locations of such connectors to be repositioned too somewhere more convenient.

Although riser assemblies are often configured such that, when installed, the expansion card is parallel to the primary system board (e.g., horizontal oriented), in some circumstances it may be desired to have the expansion cards be perpendicular to the primary system board (e.g., vertically oriented). This may allow for easier installation of the expansion cards, in some cases. In contrast to the riser assemblies noted above in which an edge connector of the riser card is directly connected to a socket (expansion slot) in the primary system board, in some riser assemblies the riser card is connected via a cable bundle to a connector on the primary system board. The cable bundle may include one or more cables that collectively carry data signals (e.g., PCIe lanes), power signals, and side-band signals. Using cables instead of directly connecting the riser card to the primary system board can be useful to allow for the vertical orientation of the expansion cards, which as noted above may be desired in some cases. Cables may also be useful when, for example, the primary system board lacks socket connectors compatible with the edge connectors of existing riser cards, for example, an OCP host processor module may have modular extensible input output (M-XIO) connector which may not be compatible with the PCI-e connector of existing riser cards. However, the use of cables can have some downsides as well. Each of the cable bundles for connecting a riser card to a primary system board includes multiple conductors and at least two (possibly more) connectors, and thus each cable bundle can be relatively expensive. In addition, each cable bundle can be relatively bulky and cumbersome to install and organize within the information processing device. Furthermore, the cables can hinder airflow and thus may impair the thermal performance of the information processing device. These issues resulting from using cables to connect riser cards to the primary system board are all multiplied when multiple riser cards, and hence multiple cables are used within an information processing device.

A technical solution to the aforementioned problems may include providing a riser card having a first electrical connector (e.g., an edge connector) that is compatible with a first complementary electrical connector (e.g., a M-XIO connector) of a primary system board (e.g., a host processing module), thereby allowing the riser card to directly establish an electrical connection with the primary system board via the aforementioned connectors. This electrical connection allows the riser card to receive data, power, and sideband signals from the primary system board without the need for a separate data, power, and sideband cables. In some examples, the first electrical connector may be an edge connector positioned at a bottom edge of a circuit board of the riser card. Accordingly, when the riser card is mounted on the primary system board, the first electrical connector is detachably connected (e.g., directly connected) to the first complementary electrical connector of the primary system board with the circuit board of the riser card being oriented perpendicular to the primary system board.

Further, the riser card may include a second electrical connector (e.g., a straddle mountable socket connector) positioned at a top edge of the riser card, which is configured to receive an expansion card oriented parallel to the circuit board of the riser card. More specifically, the expansion card includes a second complementary connector (e.g., a PCI-e edge connector) which is removably connected to the second electrical connector of the riser card, thus establishing an electrical connection with the riser card. Thus, the riser card of the present disclosure may allow the vertical mounting of the expansion card to the riser card.

Additionally, in some examples, the riser card is configured to have one or more other riser cards mounted thereto. These additional riser cards may be referred to as stackable secondary riser cards (or secondary riser cards) because they may stack one atop the other and on the original riser card. In some examples, the original riser card is oriented vertically, while the stackable secondary riser cards mounted thereto extend horizontally from the original riser card. Each stackable secondary riser card is configured to receive an expansion card coupled thereto. In addition, at least some of the electrical signals supplied to each stackable secondary riser card are conveyed thereto via the first electrical connector of the riser card.

In particular, in some examples, the riser card may include a third electrical connector (e.g., a socket connector) mounted to a face of the riser card and oriented to extend horizontally. This third electrical connector is configured to removably connect to a connector of a first stackable secondary riser card (or a secondary riser card). The third electrical connector is arranged such that, when the first stackable secondary riser card is mounted to the riser card, the first stackable secondary riser card is oriented perpendicular to the circuit board of the riser card and horizontally stacked on the riser card and a third complementary electrical connector (e.g., an edge connector) of the first stackable secondary riser card is removably connected to the third electrical connector of the riser card. The third electrical connector is electrically connected, via internal circuitry of the riser card, to pins of the first electrical connector which carry the power and sideband signals communicated with the primary system board. Moreover, the third electrical connector is configured to establish an electrical connection between the riser card and the first stackable secondary riser card which allows for the transmission of at least the power and sideband signals from the primary system board to the first stackable secondary riser card via the riser card. In contrast, in alternative approaches separate power and sideband cables may have been required for each riser card to receive power and sideband signals from the primary system board. Since the third electrical connector is oriented to extend horizontally, it allows the first stackable secondary riser card to move perpendicular to the circuit board, and the third complementary electrical connector of the first stackable secondary riser card to mate with the third electrical connector of the riser card. Further, the first stackable secondary riser card includes a fourth electrical connector (e.g., a socket connector) mounted to a face of the first stackable secondary riser card and oriented to extend vertically, thereby allowing a second expansion card to being oriented parallel to the circuit board of the riser card and mounted on the first stackable secondary riser card such that a fourth complementary electrical connector (e.g., a PCI-e edge connector) of the second expansion card is removably connected to the fourth electrical connector of the first stackable secondary riser card, and establish an electrical connection with the first stackable secondary riser card. Since the fourth electrical connector is oriented to extend vertically, it allows the second expansion card to move parallel to the circuit board, and the fourth complementary electrical connector of the second expansion card to mate with the fourth electrical connector of the first stackable secondary riser card. Thus, the first stackable secondary riser card of the present disclosure may further allow vertical mounting of the second expansion card to the first stackable secondary riser card.

In some examples, some of the pins of the fourth electrical connector of the first stackable secondary riser card, specifically, pins configured to communicate data signals, such as PCIe lane pins, may be connected to a cable (e.g., data cable) having a fifth connector at its free end, which is configured to removably connect with a fifth complementary connector of the primary system board to receive data signals from the primary system board. Other pins of the fourth electrical connector, specifically, pins configured to communicate power and sideband signals, may be connected via internal circuitry of the secondary riser card to the third electrical connector of the secondary riser card. Thus, power and sideband communicated between the primary system board and the first stackable secondary expansion card come from the original riser card (from the primary system board into the first electrical connector, from the first electrical connector into the third electrical connector, and from the third electrical connector into the first stackable secondary riser card via the third complementary electrical connector). On the other hand, data signals communicated between the primary system board and the first stackable secondary expansion card come from the cable. In this manner, the number of cable bundles that are needed can be reduced and/or the size of each cable bundle can be reduced as compared to alternative approaches. The number of cable bundles can be reduced because the original riser card does not use any cables. Moreover, although a cable bundle is provided for the second riser card (the first stackable secondary riser card), the size of that cable bundle may be reduced as compared to alternative approaches because the cable bundle only needs conductors and connectors for data lines and does not need to include conductors or connectors for the power and sideband signals. This reduction in the bulk of the cable bundle can make them less expensive, easier to install and organize within the chassis, and less obstructive to airflow.

As noted above, in some examples multiple of the secondary riser cards can be stacked horizontally. In other words, the first stackable secondary riser card is mounted horizontally to the original riser card, a second stackable secondary riser card is mounted horizontally to on the first stackable second riser card, and so on for as many stackable secondary riser cards as is desired. Moreover, each of the secondary riser cards communicates at least power and sideband signals with the primary system board via the original riser card and any other intervening secondary riser cards disposed therebetween. This may be facilitated by electrical connections between each pair of adjacent riser cards.

Specifically, in some examples, the first stackable secondary riser card may further include a sixth electrical connector (e.g., a socket connector) configured to electrically connect a second stackable secondary riser card (or another secondary riser card) to the first stackable secondary riser card. The second stackable secondary riser card may be identical to the first stackable secondary riser card. The sixth electrical connector may be oriented horizontally so as to receive another third complementary electrical connector (e.g., an edge connector) of the second stackable secondary riser card when the second stackable secondary riser card being oriented perpendicular to the circuit board of the riser card (or parallel to the first stackable secondary riser card) and horizontally stacked on the first stackable secondary riser card such that another third complementary electrical connector (e.g., an edge connector) of the second stackable secondary riser card is removably connected to the sixth electrical connector of the first stackable secondary riser card, and establish an electrical connection with the first stackable secondary riser card. The sixth electrical connector of the first stackable secondary riser card is electrically connected via internal circuitry of the first stackable secondary riser card to the third complementary electrical connector of the first stackable secondary riser card such that the power and sideband signals are extended to the sixth electrical connector. The sixth electrical connector then extends the power and sideband signals to the second stackable secondary riser card via its connection with the other third complementary electrical connector of the second stackable secondary riser card.

Additional secondary riser cards may be stacked onto the first and second secondary riser cards in the same manner as described above, with each newly added secondary riser card being electrically connected to the previous secondary riser card to receive power and sideband signals therefrom. Each secondary riser card may receive data signals via a corresponding cable bundle. However, as noted above, each cable bundle may have less conductors and/or less connectors than in alterative approaches, and thus may be less expensive, easier to work with, and less obstructive to airflow. In addition, the ability to stack any number of secondary riser cards together on the original riser card can provide for increased customizability and upgradability of the information processing device. For example, an information processing device originally configured to receive only one expansion card can be easily retrofitted by obtaining a secondary riser card and adding it to the existing original riser card; in contrast, to achieve a similar upgrade using other riser cards may require removing and discarding a one-unit riser assembly and purchasing a new two-unit riser assembly, which can be wasteful and more costly. In addition, the modular nature of the riser cards allows for a reduction in SKUs, as many different configurations of riser assembly can be created using the riser card and secondary riser cards (two SKUs), as opposed to having a one-unit riser card, a two-unit riser card, a three-unit riser card, a four-unit riser card, etc., which each have their own SKU.

In one or more examples, each of the riser card and the stackable secondary riser card is configured to electrically connect with a corresponding expansion card having at least 4 Unit Space (Uspace) height.

Referring to Figures, FIG. 1A depicts a block diagram of a riser card 100. It should be understood that FIG. 1A is not intended to illustrate specific shapes, dimensions, or other structural details accurately or to scale and that implementations of the riser card 100 may have different numbers and arrangements of the illustrated components and may also include other parts that are not illustrated. Further, it may be noted that FIG. 1A may be a representation of a side view of the riser card 100. In some examples, the riser card 100 is a peripheral card that may plug into an expansion slot on the primary system board and enable an information processing device to control a peripheral device (e.g., an expansion card) connected to the peripheral card. The riser card 100 includes a circuit board 102, a first electrical connector 104, a second electrical connector 106, a third electrical connector 108, and a plurality of mounting holes 110. The riser card 100 may be coupled to a riser cage (not shown) by extending fasteners (not shown) into the plurality of mounting holes 110 in the circuit board 102 and a plurality of mounting openings (not shown) in the riser cage.

The circuit board 102 may be a printed circuit board having conductive traces (not shown) therein. The circuit board 102 has a bottom edge 112, a top edge 114, a pair of peripheral edges 116 connected to the top and bottom edges 112, 114, a face 118 (or a first face), and a second face (not shown) opposite to the face 118.

The first electrical connector 104 is an edge connector (e.g., golden fingers connector) positioned at the bottom edge 112 of the circuit board 102. In particular, the first electrical connector 104 is oriented to extend vertically along a first direction 10 from the bottom edge 112 of the circuit board 102. In some examples, the first electrical connector 104 has a profile that is complementary to the profile of a modular extensible input output connector (M-XIO connector). For example, the first electrical connector 104 is defined by three connector portions (e.g., a first connector portion 104A, a second connector portion 104B, and a third connector portion 104C), which are separated from each other by a corresponding gap, where a width of one of the first connector portion 104A is smaller than the width of the second and/or third connector portions 104B, 104C. In such examples, the first connector portion 104A may be used for transferring power and sideband signals and the second and third connector portions 104C, 104C may be used for transferring data signals. Accordingly, in one or more examples, the first electrical connector 104 may be configured to transfer the power, sideband, and data signals to the riser card 100 from the primary system board. It may be noted that the first electrical connector 104, for example, the M-XIO connector is a standardized connector defined as per the guidelines of an open compute program (OCP program).

The second electrical connector 106 is a straddle mountable socket connector having a profile that is compatible to the profile of a PCI-e connector. The second electrical connector 106 is positioned at the top edge 114 of the circuit board 102. For example, the second electrical connector 106 is mountable on the top edge 114 of the circuit board 102 such that a first leg 106A of the second electrical connector 106 extends along a portion of the face 118 of the circuit board 102 and a second leg (not labeled) of the second electrical connector 106 extends along another portion the second face of the circuit board 102. In such examples, the second electrical connector 106 is oriented to extend vertically along a second direction 20 opposite to the first direction 10 from the top edge 114 of the circuit board 102. In one or more examples, the second electrical connector 106 may be configured to transfer the power, sideband, and data signals from the riser card 100 to the expansion card, for example. Specifically, electrical contacts of the second electrical connector 106 which are to carry power and sideband signals are electrically connected via internal circuitry in the riser card 100 (indicated by dotted lines in FIG. 1A) to electrical contacts of the first connector portion 104A. Similarly, electrical contacts of the second electrical connector 106 which are to carry data signals are electrically electrical connected via internal circuitry in the riser card 100 to contacts of the second connector portion 104B or to electrical contacts of third connector portion 104C. In FIG. 1A some electrical contacts (e.g., pins) of the aforementioned connectors are depicted as rectangles, but these depictions are not meant to be accurate or exhaustive in depicting the number, location, or structure of the electrical contacts. In addition, in FIG. 1A the electrical connections between the electrical contacts are illustrated for only a few of the contacts as examples, but it should be understood that in some examples each electrical contact in the first electrical connector 104 may be electrically connected to at least one corresponding contact in the second electrical connector 106.

The third electrical connector 108 is a socket connector, which may be configured to transfer power and sideband signals from the riser card 100 to a stackable secondary riser card, for example. The third electrical connector 108 is mounted to the face 118 of the circuit board 102. In particular, the third electrical connector 108 is oriented to extend horizontally along a third direction 30 from the face 118 of the circuit board 102. Specifically, electrical contacts of the third electrical connector 108 are electrically connected via internal circuitry in the riser card 100 (indicated by dotted lines in FIG. 1A) to electrical contacts of the first connector portion 104A. In addition, in FIG. 1A the electrical connections between the electrical contacts are illustrated for only a few of the contacts as examples, but it should be understood that in some examples each electrical contact in the first connector portion 104A may be electrically connected to at least one corresponding contact in the third electrical connector 108.

Figure 1B:
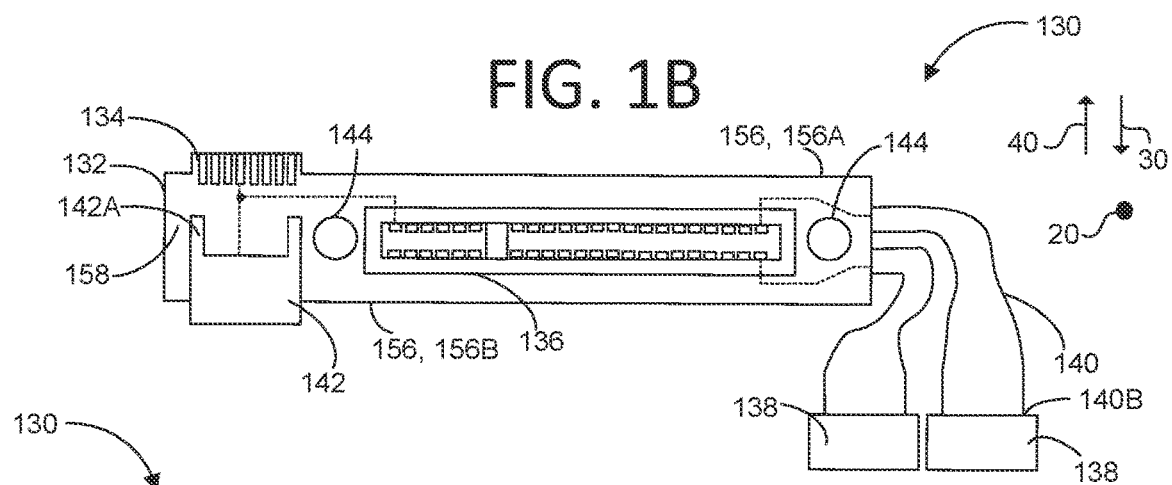
FIG. 1B illustrates a block diagram representing a top view of a stackable secondary riser card according to an example of the present disclosure.
Figure 1C:
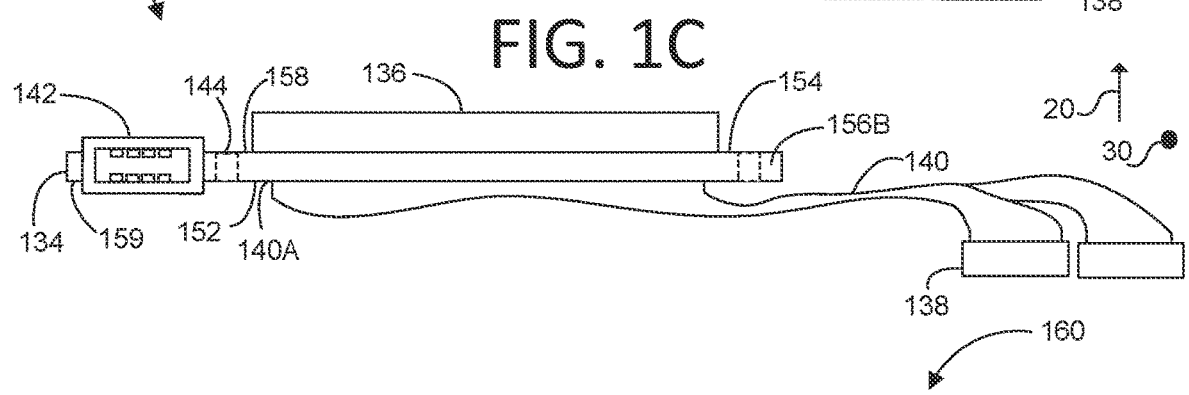
FIG. 1C illustrates a block diagram representing a side view of the stackable secondary riser card of FIG. 1B according to an example of the present disclosure.

Referring to Figures, FIG. 1B depicts a block diagram of a stackable secondary riser card 130 (e.g., a first stackable secondary riser card) and FIG. 1C depicts another block diagram of the stackable secondary riser card 130 of FIG. 1B. It should be understood that each of the Figures, FIGS. 1B-1C is not intended to illustrate specific shapes, dimensions, or other structural details accurately or to scale and that implementations of the stackable secondary riser card 130 may have different numbers and arrangements of the illustrated components and may also include other parts that are not illustrated. Further, it may be noted that FIG. 1B may be a representation of a top view of the stackable secondary riser card 130 and FIG. 1C may be a representation of a side view of the stackable secondary riser card 130. In some examples, the stackable secondary riser card 130 includes a secondary circuit board 132, a third complementary electrical connector 134, a fourth electrical connector 136, a fifth electrical connector 138, a cable 140, a sixth electrical connector 142, and a plurality of second mounting holes 144. The stackable secondary riser card 130 may be coupled to the riser cage by extending second fasteners (not shown) through the plurality of second mounting holes 144 in the secondary circuit board 132 and the plurality of second mounting openings (not shown) in the riser cage.

The secondary circuit board 132 may be a printed circuit board having conductive traces (not shown) therein. The secondary circuit board 132 has a bottom edge 152, a top edge 154, a pair of peripheral edges 156 connected to the top and bottom edges 152, 154, a face 158 (or a first face), and a second face 159 opposite to the face 158.

The third complementary electrical connector 134 is an edge connector (e.g., golden fingers connector) positioned at a first peripheral edge 156A of the secondary circuit board 132. In particular, the third complementary electrical connector 134 is oriented to extend horizontally along a fourth direction 40 from a first peripheral edge 156A of the secondary circuit board 132. In one or more examples, the third complementary electrical connector 134 has a profile that is complementary to the profile of the third electrical connector 108. In one or more examples, the third complementary electrical connector 134 may be configured to transfer the power and sideband signals from the riser card 100 to the stackable secondary riser card 130.

The fourth electrical connector 136 is a socket connector having a profile that is compatible to the profile of a PCI-e connector. The fourth electrical connector 136 is mounted to the face 158 of the secondary circuit board 132. In particular, the fourth electrical connector 136 is oriented to extend vertically along a second direction 20 from the face 158 of the secondary circuit board 132. The fourth electrical connector 136 includes some electrical contacts which are for carrying power and sideband signals, and these contacts are electrically connected to the electrical contacts of the third complimentary electrical connector 134. The fourth electrical connector 136 also includes some electrical contacts which are for carrying data signals, and these contacts are electrically connected to corresponding conductors in a cable bundle 140.

The fifth electrical connector 138 is a pluggable connector e.g., a modular extensible input output plug having a profile that is compatible to a modular extensible input output socket. The fifth electrical connector 138 is electrically connected to the fourth electrical connector 136 via the cable bundle 140. In particular, a first end 140A of the cable 140 is coupled to the fourth electrical connector 136 and a second end 140B of the cable 140 is coupled to the fifth electrical connector 138. More particularly, the first end 140A of the cable 140 is coupled to the fourth electrical connector 136 at the bottom edge 152 of the stackable secondary riser card 130. In such examples, the fifth electrical connector 138 and the cable 140 may be configured to transfer the data signals from the primary system board to the fourth electrical connector 136 of the stackable secondary riser card 130.

The sixth electrical connector 142 is a socket connector having a profile that is compatible to the profile of third complementary electrical connector 134. The sixth electrical connector 142 is mounted on the peripheral edge 156 of the secondary circuit board 132. In particular, the sixth electrical connector 142 is oriented to extend horizontally along a third direction 30 opposite to the fourth direction 40, from a second peripheral edge 156B of the secondary circuit board 132. In one or more examples, the sixth electrical connector 142 refers to a type of connector which is mountable on the second peripheral edge 156B such that a first leg 142A of the sixth electrical connector 142 extends along a portion of the face 158 of the secondary circuit board 132 and a second leg (not labeled) of the sixth electrical connector 142 extends along another portion the second face 159 of the secondary circuit board 132. In one or more examples, the sixth electrical connector 142 may be configured to transfer the power and sideband signals from the stackable secondary riser card 130 to another stackable secondary riser card (not shown). The sixth electrical connector 142 includes electrical contacts which are electrically connected to the electrical contacts of the third complimentary electrical connector 134, so that the power and sideband signals carried by the electrical connector 134 are transferred to the sixth electrical connector 142.

Figure 1D:
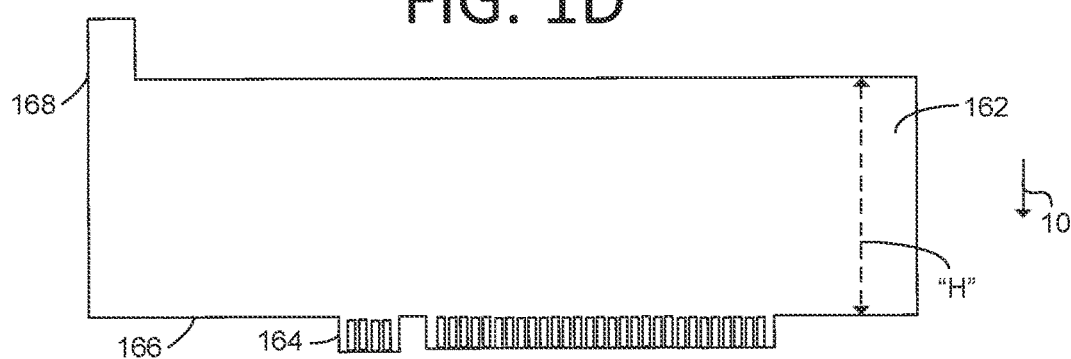
FIG. 1D illustrates a block diagram of an expansion card according to an example of the present disclosure.

Referring to Figures, FIG. 1D depicts a block diagram of an expansion card 160. In some examples, the expansion card 160 is a PCI-e expansion card such as a graphics processing unit (GPU) card. In such examples, the expansion card 160 includes a body 162 and a second complementary electrical connector 164. In some examples, the second complementary electrical connector 164 extends from the body 162. In particular, the second complementary electrical connector 164 is oriented to extend along a first direction 10 from a bottom edge 166 of the body 162. Further, the body 162 may include a mounting bracket 168 configured to be attached to the riser cage, when the expansion card 160 is installed in the information processing device. In one or more examples, the second complementary electrical connector 164 is a PCI-e edge connector having a profile complementary to the profile of the second electrical connector 106 of the riser card 100 and/or the fourth electrical connector 136 of the stackable secondary riser card 130. In some examples, the expansion card 160 has a height "H". In the example of FIG. 1D, the expansion card 160 has at least 4 Unit Space (Uspace) height "H".

Figure 2A:
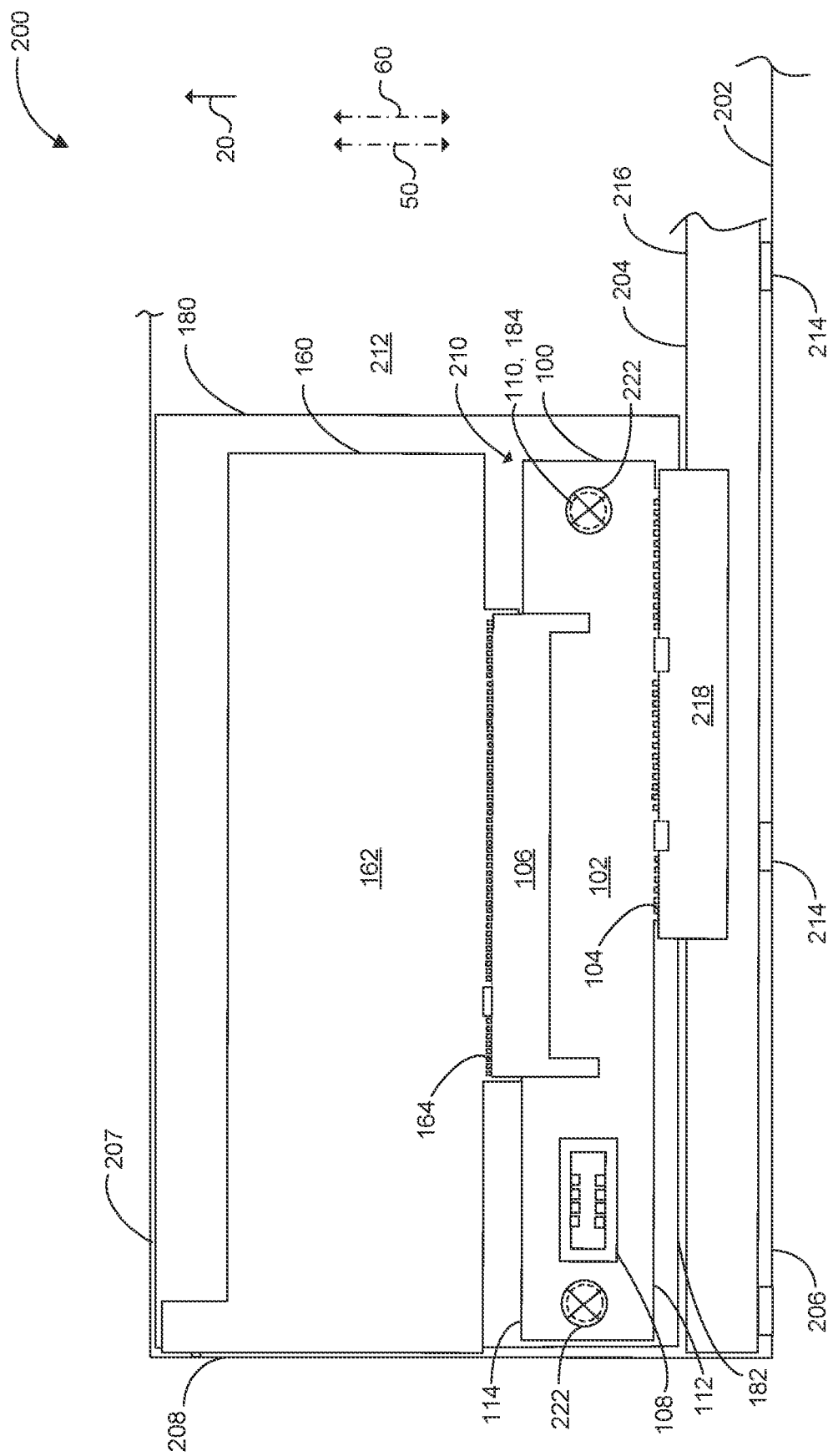
FIG. 2A illustrates a block diagram of a portion of an information processing device having a chassis, an expansion card, a primary system board, and a riser assembly having a riser card according to an example of the present disclosure.

FIG. 2A depicts a block diagram of a portion of an information processing device 200 having a chassis 202, a primary system board 204, an expansion card 160 of FIG. 1D, and a riser assembly 210 having a riser card 100 of FIG. 1A and a riser cage 180. In some examples, the information processing device 200 may be a computer (e.g., a server, a storage device), a networking device (e.g., a switch, an access point), or the like.

The chassis 202 may be an enclosure formed by a pair of peripheral sidewalls (not shown), a base 206, a cover 207, a rear panel 208, and a front panel (not shown). It may be noted herein that a portion of the base 206, the cover 207, and the rear panel 208 are only shown in FIG. 2A for ease of illustration of other electronic components of the information processing device 200. The pair of peripheral sidewalls are connected to the base 206, the cover 207, the rear panel 208, and the front panel to define an internal volume 212 of the chassis 202.

Figure 2B:
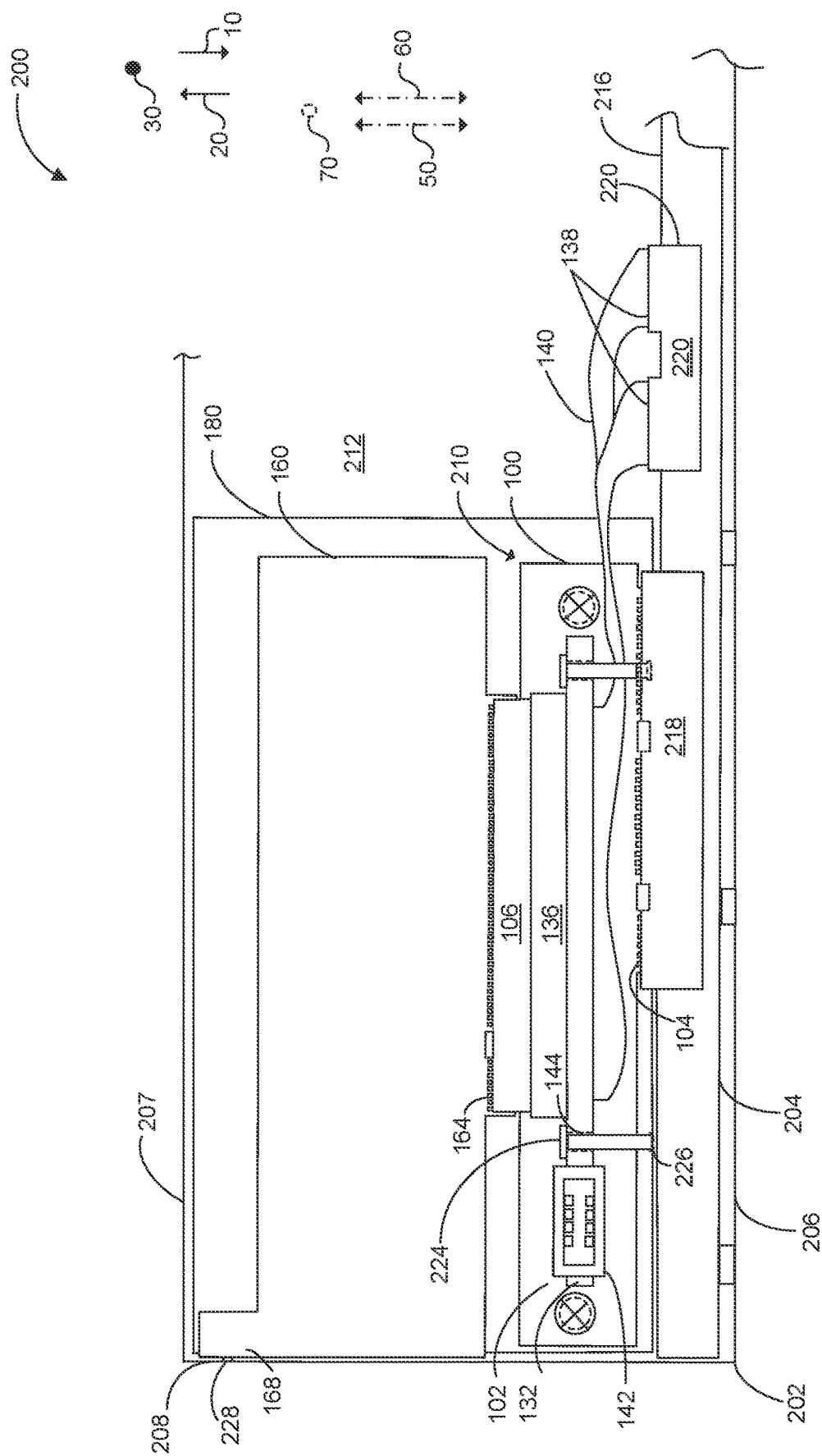
FIG. 2B illustrates a block diagram of the information processing device of FIG. 2A additionally having a stackable secondary riser card according to an example of the present disclosure.

The primary system board 204 is positioned within the internal volume 212 and mounted on the base 206 via a plurality of support members 214. In some examples, the primary system board 204 is a host processor module. In such examples, the host processor module may include a plurality of electronic components as per the OCP guidelines. In some examples, the primary system board 204 includes a substrate 216 and the plurality of electronic components, such as a central processing unit, resistors, capacitors, data ports, and power ports, or the like mounted on the substrate 216. The primary system board 204 further includes a first complementary electrical connector 218 and a fifth complementary electrical connector 220 (as shown in FIG. 2B). In some examples, the first complementary electrical connector 218 is a modular extensible input output connector (M-XIO connector) and the fifth complementary electrical connector 220 is a modular extensible input output socket. In some examples, the first complementary electrical connector 218 and the fifth complementary electrical connector 220 are mounted on the substrate 216 such that each of the first complementary electrical connector 218 and the fifth complementary electrical connector 220 extends vertically along a second direction 20.

As discussed herein, the riser card 100 includes a circuit board 102, a first electrical connector 104, a second electrical connector 106, a third electrical connector 108, and a plurality of mounting holes 110. In some examples, the riser card 100 is mounted on the riser cage 180 such that the bottom edge 112 of the riser card 100 is adjacent to a bottom edge 182 of the riser cage 180 and the plurality of mounting holes 110 of the riser card 100 is aligned with a plurality of mounting openings 184 of the riser cage 180. In such examples, a fastener of a plurality of fasteners 222 is extended through a corresponding hole of the plurality of mounting holes 110 and a corresponding opening of the plurality of mounting openings 184 to detachably couple the riser card 100 to the riser cage 180 and thereby form the riser assembly 210.

In some examples, the riser cage 180 is configured to removably install the riser card 100 in the chassis 202. For example, the riser cage 180 is installed adjacent to the rear panel 208 of the chassis 202 such that the riser card 100 is mounted on the primary system board 204 of the information processing device 200. In such examples, when the riser card 100 is mounted on the primary system board 204, the first electrical connector 104 is detachably connected to the first complementary electrical connector 218 of the primary system board 204 with the circuit board 102 perpendicular to the primary system board 204. In other words, the riser card 100 is mounted on the primary system board 204 positioned below the circuit board 102 such that the first electrical connector 104 (e.g., the first edge connector) positioned at the bottom edge 112 of the circuit board 102 mates with the first complementary electrical connector 218 (e.g., the M-XIO connector) of the primary system board 204. In such examples, the mating of the first electrical connector 104 with the first complementary electrical connector 218 occurs by a motion of the first electrical connector 104 along a first mating axis 50 parallel to the circuit board 102. Accordingly, the first electrical connector 104 of the riser card 100 may receive power signals, data signals, and sideband signals from the first complementary electrical connector 218.

Further, in such examples, the second electrical connector 106 is configured to mate with the second complementary electrical connector 164 of an expansion card 160 oriented parallel to the circuit board 102. In other words, the expansion card 160 is mounted on the riser card 100 such that the second complementary electrical connector 164 (e.g., the second edge connector) of the expansion card 160 positioned above the circuit board 102 mates with the second electrical connector 106 (e.g., the straddle mountable socket connector) mounted to the top edge 114 of the circuit board 102. In such examples, the mating of the second complementary electrical connector 164 with the second electrical connector 106 occurs by the motion of the second complementary electrical connector 164 along a second mating axis 60 parallel to the first mating axis 50. Since the second electrical connector 106 is positioned at the top edge 114 of the riser card 100, it allows the expansion card 160 to move parallel to the circuit board 102, and the second complementary electrical connector 164 of the expansion card 160 to mate with the second electrical connector 106 of the riser card 100. Thus, the riser card 100 of the present disclosure may allow vertical mounting of the expansion card 160 to the riser card 100. In such examples, the mounting bracket 168 of the expansion card 160 is further detachably coupled to the rear panel via at least one coupling element 228.

Referring to Figures, FIG. 2B depicts a block diagram of the information processing device 200 of FIG. 2A further including a stackable secondary riser card 130 (or a first stackable secondary riser card) of FIGS. 1B and 1C assembled to the riser card 100. As discussed herein, the stackable secondary riser card 130 includes a secondary circuit board 132, a third complementary electrical connector 134, a fourth electrical connector 136, a fifth electrical connector 138, a cable 140, a sixth electrical connector 142, and a plurality of second mounting holes 144. In some examples, the stackable secondary riser card 130 is oriented such that the first peripheral edge 156A of the secondary circuit board 132 is perpendicular to and faces the circuit board 102 of the riser card 100. Later, the stackable secondary riser card 130 is stacked to the riser card 100 such that the third complementary electrical connector 134 (as shown in FIG. 1B) of the stackable secondary riser card 130 is detachably connected to the third electrical connector 108 (as shown in FIG. 2A) of the riser card 100 with the secondary circuit board 132 being perpendicular to the circuit board 102. Since the third electrical connector 108 of the riser card 100 is oriented to extend horizontally, it allows the secondary circuit board 132 to move perpendicular to the circuit board 102, and the third complementary electrical connector 134 of the stackable secondary riser card 130 to mate with the third electrical connector 108 of the riser card 100. In other words, the stackable secondary riser card 130 is stacked to the riser card 100 such that the third complementary electrical connector 134 (e.g., the third edge connector) of the stackable secondary riser card 130 oriented perpendicular to the circuit board 102 mates with the third electrical connector 108 (e.g., the socket connector) of the riser card 100. In such examples, the mating of the third complementary electrical connector 134 with the third electrical connector 108 occurs by the motion of the third complementary electrical connector 134 along a third mating axis 70 perpendicular to the first or second mating axes 50, 60. In such examples, a fastener of a plurality of second fasteners 224 is extended through a corresponding hole of the plurality of second mounting holes 144 and a corresponding opening of the plurality of second mounting openings 226 in the riser cage 180 to detachably couple the stackable secondary riser card 130 to the riser cage 180, and thereby form the riser assembly 210. Accordingly, the third complementary electrical connector 134 of the stackable secondary riser card 130 receives the power and sideband signals from the third electrical connector 108 of the riser card 100.

In some examples, the fourth electrical connector 136 may be oriented to extend vertically along the second direction 20 and configured to mate with a fourth complementary electrical connector (not shown) of a second expansion card (not shown) oriented perpendicular to the secondary circuit board 132. In particular, the second expansion card is mounted on the stackable secondary riser card 130 such that the fourth complementary connector (e.g., a second edge connector) of the second expansion card positioned above the secondary circuit board 132 mates with the fourth electrical connector 136 (e.g., socket connector) mounted to the face 158 of the secondary circuit board 132. In such examples, the mating of the fourth complementary electrical connector with the fourth electrical connector 136 may occur by the motion of the fourth complementary electrical connector along the first or second mating axes 50, 60. Since the fourth electrical connector 136 is oriented to extend vertically, it allows the second expansion card to move parallel to the circuit board 102 (or perpendicular to the secondary circuit board 132), and the fourth complementary electrical connector of the second expansion card to mate with the fourth electrical connector 136 of the stackable secondary riser card 130. Thus, the stackable secondary riser card 130 of the present disclosure may further allow vertical mounting of the second expansion card to the stackable secondary riser card 130.

The fifth electrical connector 138 of the stackable secondary riser card 130 is configured to mate with a fifth complementary electrical connector 220 of the primary system board 204 such that the fifth electrical connector 138 receives the data signals from the fifth complementary electrical connector 220 via the cable 140. Further, the sixth electrical connector 142 of the stackable secondary riser card 130 may be oriented to extend horizontally along a third direction 30. In one or more examples, the sixth electrical connector 142 may be configured to receive another third complementary electrical connector (not shown) of a second stackable secondary riser card (not shown). In such examples, the sixth electrical connector 142 may be configured to transfer the power and sideband signals from the stackable secondary riser card 130 to the second stackable secondary riser card via the sixth electrical connector 142 and the other third complementary electrical connector of the second stackable secondary riser card.

Figure 3A:
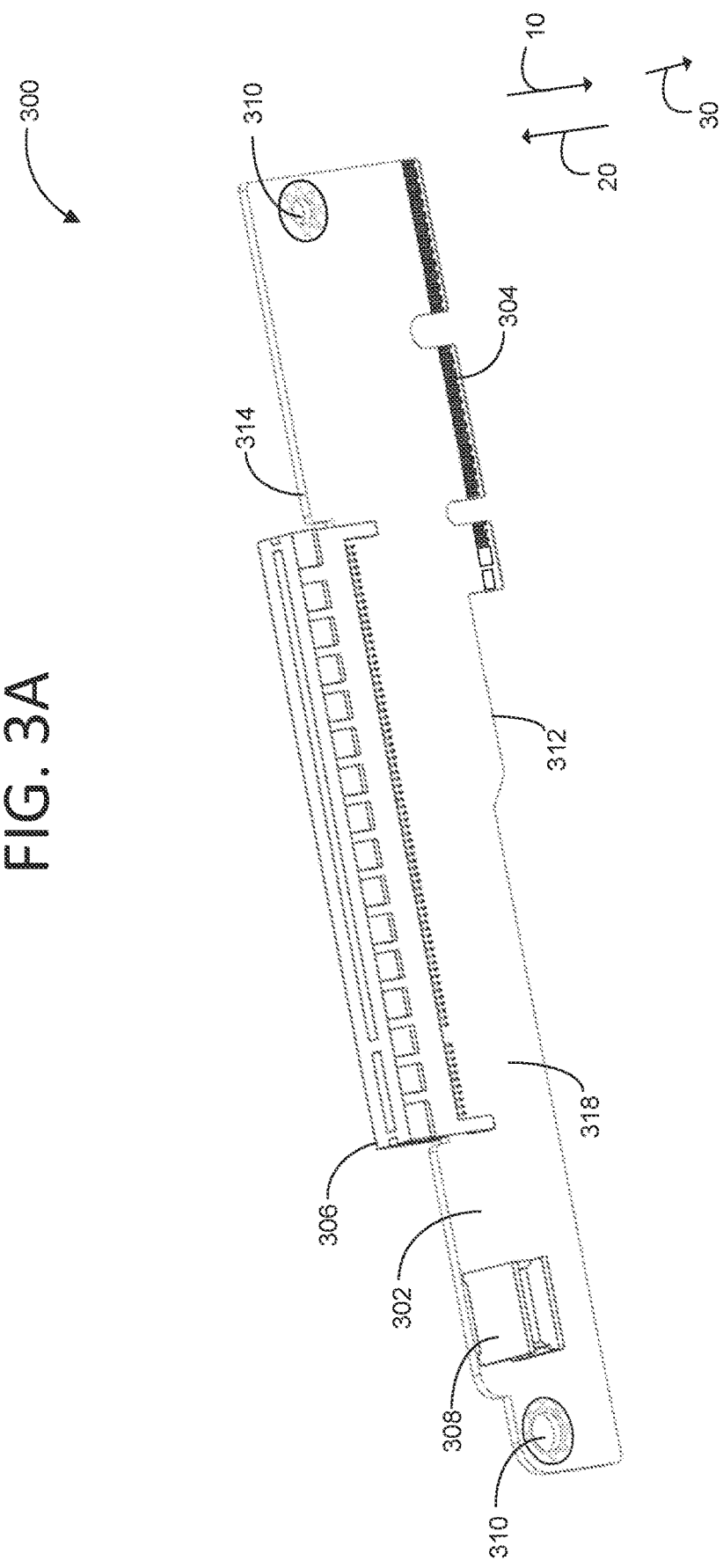
FIG. 3A illustrates a perspective view of a riser card according to an example of the present disclosure.

Referring to Figures, FIG. 3A depicts a perspective view of a riser card 300. The riser card 300 is one implementation of the riser card 100 described above. The riser card 300 includes a circuit board 302, a first electrical connector 304, a second electrical connector 306, a third electrical connector 308, and a plurality of mounting holes 310.

The circuit board 302 has a bottom edge 312, a top edge 314, a face 318 (or a first face), and a second face (not shown) opposite to the face 318. The first electrical connector 304 is oriented to extend vertically along a first direction 10 from the bottom edge 312 of the circuit board 302. In some examples, the first electrical connector 304 has a profile that is complementary to the profile of a modular extensible input output connector (M-XIO connector). The second electrical connector 306 is positioned at the top edge 314 of the circuit board 302. In particular, the second electrical connector 306 is oriented to extend vertically along a second direction 20 opposite to the first direction 10 from the top edge 314 of the circuit board 302. In some examples, the second electrical connector 306 is a straddle mountable socket connector having a profile that is compatible to the profile of a PCI-e connector. The third electrical connector 308 is mounted to the face 318 of the circuit board 302. In particular, the third electrical connector 308 is oriented to extend horizontally along a third direction 30 from the face 318 of the circuit board 302. In some examples, the third electrical connector 108 is a first socket connector.

FIG. 3B depicts a perspective side view of a stackable secondary riser card 330 and FIG. 3B depicts another perspective side view of the stackable secondary riser card 330 of FIG. 3A. The stackable secondary riser card 330 is an example implementation of secondary riser card 130 described above. In some examples, the stackable secondary riser card 330 includes a secondary circuit board 332, a third complementary electrical connector 334, a fourth electrical connector 336, a fifth electrical connector 338, a cable 340, a sixth electrical connector 342, and a plurality of second mounting holes 344.

The secondary circuit board 332 has a bottom edge 352, a top edge 354, a pair of peripheral edges 356, a face 358 (or a first face), and a second face (not labeled) opposite to the face 358. The third complementary electrical connector 334 is oriented to extend horizontally along a fourth direction 40 from a first peripheral edge 356A of the secondary circuit board 332. The third complementary electrical connector 334 is an edge connector having a profile that is complementary to the profile of the third electrical connector 308 (as shown in FIG. 3A). In some examples, the third complementary electrical connector 334 is configured to transfer the power and sideband signals from the riser card 300 to the stackable secondary riser card 330. The fourth electrical connector 336 is mounted to the face 358 of the secondary circuit board 332. In particular, the fourth electrical connector 336 is oriented to extend vertically along a second direction 20 from the face 358 of the secondary circuit board 332. The fourth electrical connector 336 is a socket connector having a profile that is compatible to the profile of a PCI-e connector. The fifth electrical connector 338 is electrically connected to the fourth electrical connector 336 via the cable 340. In some examples, the fifth electrical connector 338 is a pluggable connector e.g., a modular extensible input output plug having a profile that is compatible to a modular extensible input output socket. The fifth electrical connector 338 and the cable 340 are configured to transfer the data signals from the primary system board to the fourth electrical connector 336 of the stackable secondary riser card 330. The sixth electrical connector 342 is mounted on the second peripheral edge 356B of the secondary circuit board 332 and is oriented to extend horizontally along a third direction 30 opposite to the fourth direction 40 from the second peripheral edge 356B of the secondary circuit board 332. In one or more examples, the sixth electrical connector 342 is configured to transfer the power and sideband signals from the stackable secondary riser card 330 to another stackable secondary riser card (not shown).

FIG. 3D depicts a perspective side view of an expansion card 360. In some examples, the expansion card 360 is a PCI-e expansion card such as a graphics processing unit (GPU) card. In such examples, the expansion card 360 includes a body 362 having a circuit board 363 disposed therebetween, and a second complementary electrical connector 364. In some examples, the second complementary electrical connector 364 extends from the circuit board 363. In particular, the second complementary electrical connector 364 is oriented to extend along a first direction 10 from a bottom edge 366 of the circuit board 363. The body 362 may include a mounting bracket 368 configured to be attached to the riser cage, when the expansion card 360 is installed in the information processing device. Further, the expansion card 360 includes an input output port 370 extending from the circuit board 363 and disposed adjacent to the mounting bracket 368. In one or more examples, the second complementary electrical connector 364 is a PCI-e edge connector having a profile complementary to the profile of the second electrical connector 306 of the riser card 300 and/or the fourth electrical connector 336 of the stackable secondary riser card 330. In some examples, the expansion card 360 has a height "H". In the example of FIG. 3D, the expansion card 360 has at least 4 Unit Space (Uspace) height "H".

Figure 4A:
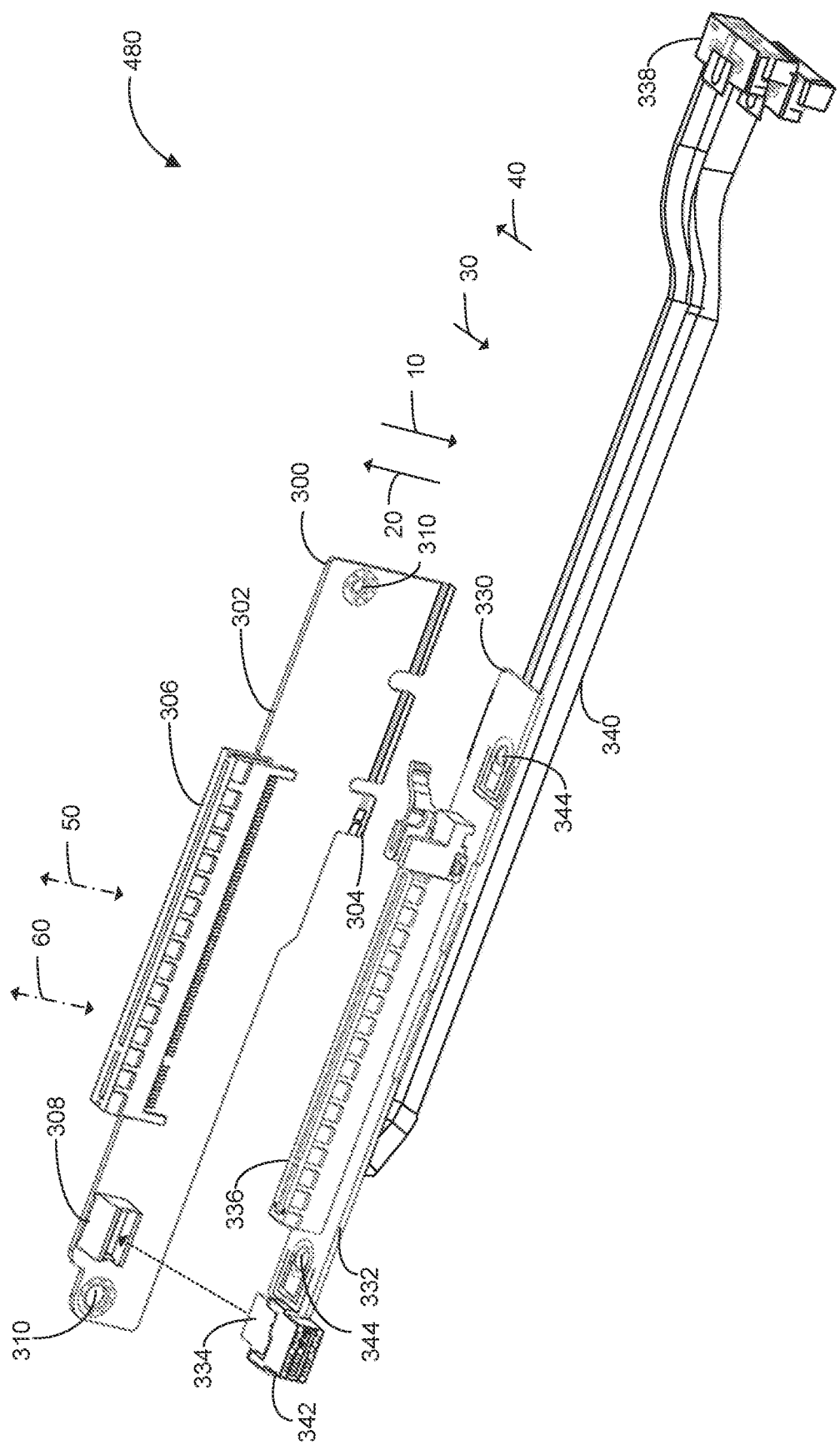
FIG. 4A illustrates an exploded perspective view of a riser assembly having a riser card of FIG. 3A and a stackable secondary riser card of FIGS. 3B-3C according to an example of the present disclosure.

FIG. 4A depicts an exploded perspective view of a riser assembly 480 having a riser card 300 and a stackable secondary riser card 330. As discussed herein the riser assembly 480 may additionally include a riser cage (not shown) configured to provide support to the riser card 300 and the stackable secondary riser card 330. It may be noted herein that the riser cage is not shown in the example of FIG. 4A for ease of illustration of other components.

In some examples, the riser card 300 is oriented to extend vertically such that the circuit board 302 is positioned perpendicular to the primary system board (not shown). In such examples, the first electrical connector 304 may be positioned adjacent to the primary system board and the second electrical connector 306 may be positioned away from the primary system board. In particular, the first electrical connector 304 is oriented to extend vertically along the first direction 10 and the second electrical connector 306 is oriented to extend vertically along the second direction 20 opposite to the first direction 10. Further, the third electrical connector 308 is oriented to extend horizontally along a third direction which may be a direction parallel to the primary system board. In some examples, the first electrical connector 304 may be configured to mate with a first complementary electrical connector of the primary system board positioned below the circuit board. In such examples, the mating may occur by motion of the first electrical connector 304 along a first mating axis 50 parallel to the circuit board 302. The second electrical connector 306 may be configured to mate with a second complementary electrical connector of an expansion card positioned above the circuit board 302. In such examples, the mating may occur by the motion of the second complementary electrical connector along a second mating axis 60 parallel to the first mating axis 50. Although not illustrated, the riser card 300 may be coupled to the riser cage by extending fasteners into a plurality of mounting holes 310 in the circuit board 302 and a plurality of mounting openings (not shown) in the riser cage.

The stackable secondary riser card 330 is oriented to extend horizontally such that the secondary circuit board 332 is positioned perpendicular to the circuit board 302 of the riser card 300. In such examples, the third complementary electrical connector 334 may be positioned adjacent to the third electrical connector 308 of the riser card and the sixth electrical connector 342 is positioned away from the third electrical connector 308. In particular, the third complementary electrical connector 334 is oriented to extend horizontally along the fourth direction 40 opposite to the third direction 30, and the sixth electrical connector 342 is also oriented to extend horizontally along the third direction 30. Further, the fourth electrical connector is oriented to extend vertically along the second direction 20. The fifth electrical connector 338 is electrically connected to the fourth electrical connector 336 via the cable 340. The stackable secondary riser card 330 may be coupled to the riser cage by extending second fasteners (not shown) through a plurality of second mounting holes 344 in the secondary circuit board 332 and the plurality of second mounting openings (not shown) in the riser cage.

Figure 4B:
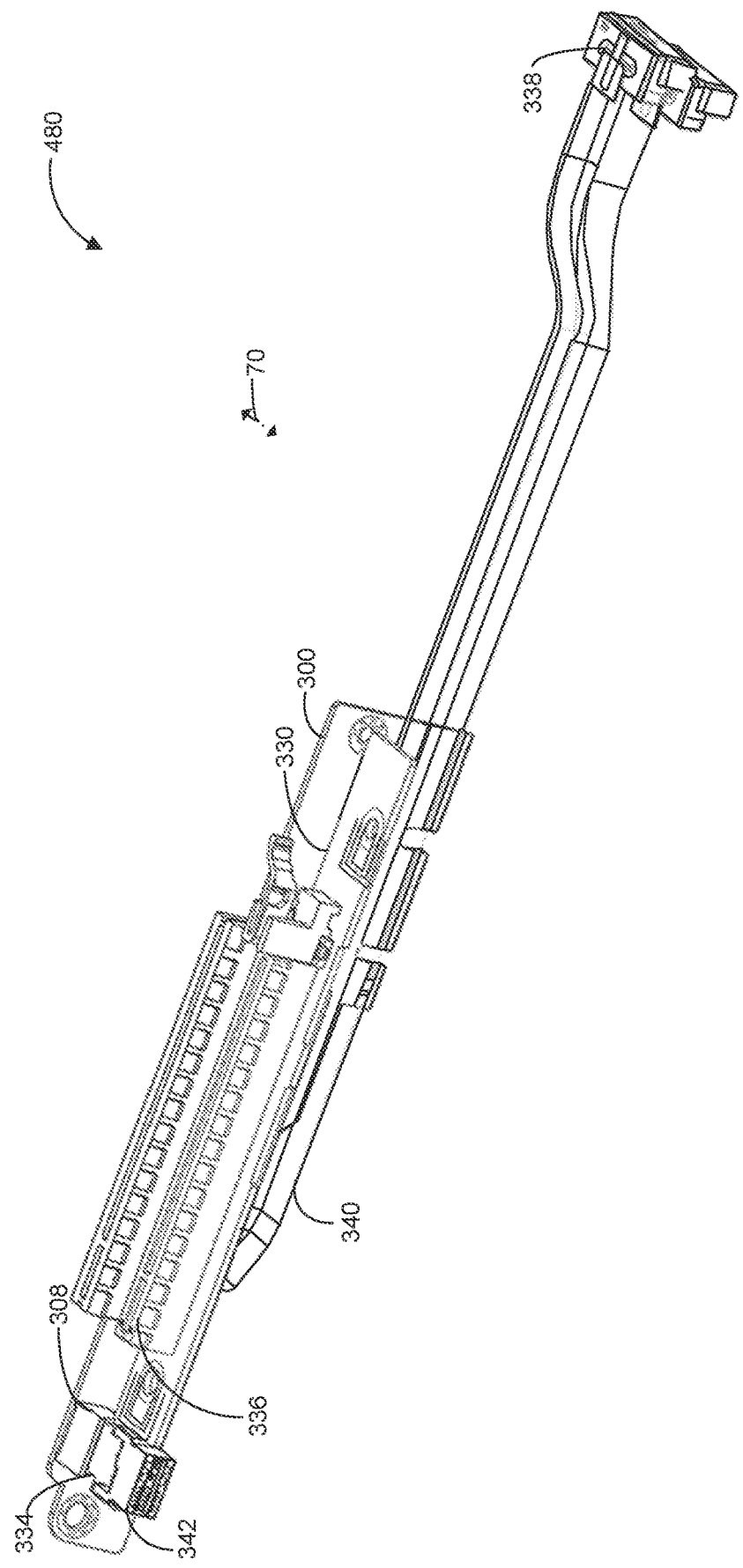
FIG. 4B illustrates an assembled perspective view of the riser assembly of FIG. 4A according to an example of the present disclosure.

FIG. 4B depicts an assembled perspective view of the riser assembly 480 of FIG. 4A. In some examples, the stackable secondary riser card 330 is stacked on the riser card 300 such that the third complementary electrical connector 334 of the stackable secondary riser card 330 mates with the third electrical connector 308. In such examples, the mating occurs by the motion of the third complementary electrical connector 334 along a third mating axis 70 perpendicular to the first or second mating axes 50, 60. In some examples, the fourth electrical connector 336 may be configured to mate with a fourth complementary electrical connector of a second expansion card positioned above the secondary circuit board 332. In such examples, the mating may occur by the motion of the fourth complementary electrical connector along the second mating axis 60 parallel to the first mating axis 50. Further, the fifth electrical connector 338 may be configured to mate with a fifth complementary electrical connector of the primary system board and electrically connect the fifth complementary electrical connector with the fourth electrical connector 336 via the cable 340 and the fifth electrical connector 338.

Figure 4C:
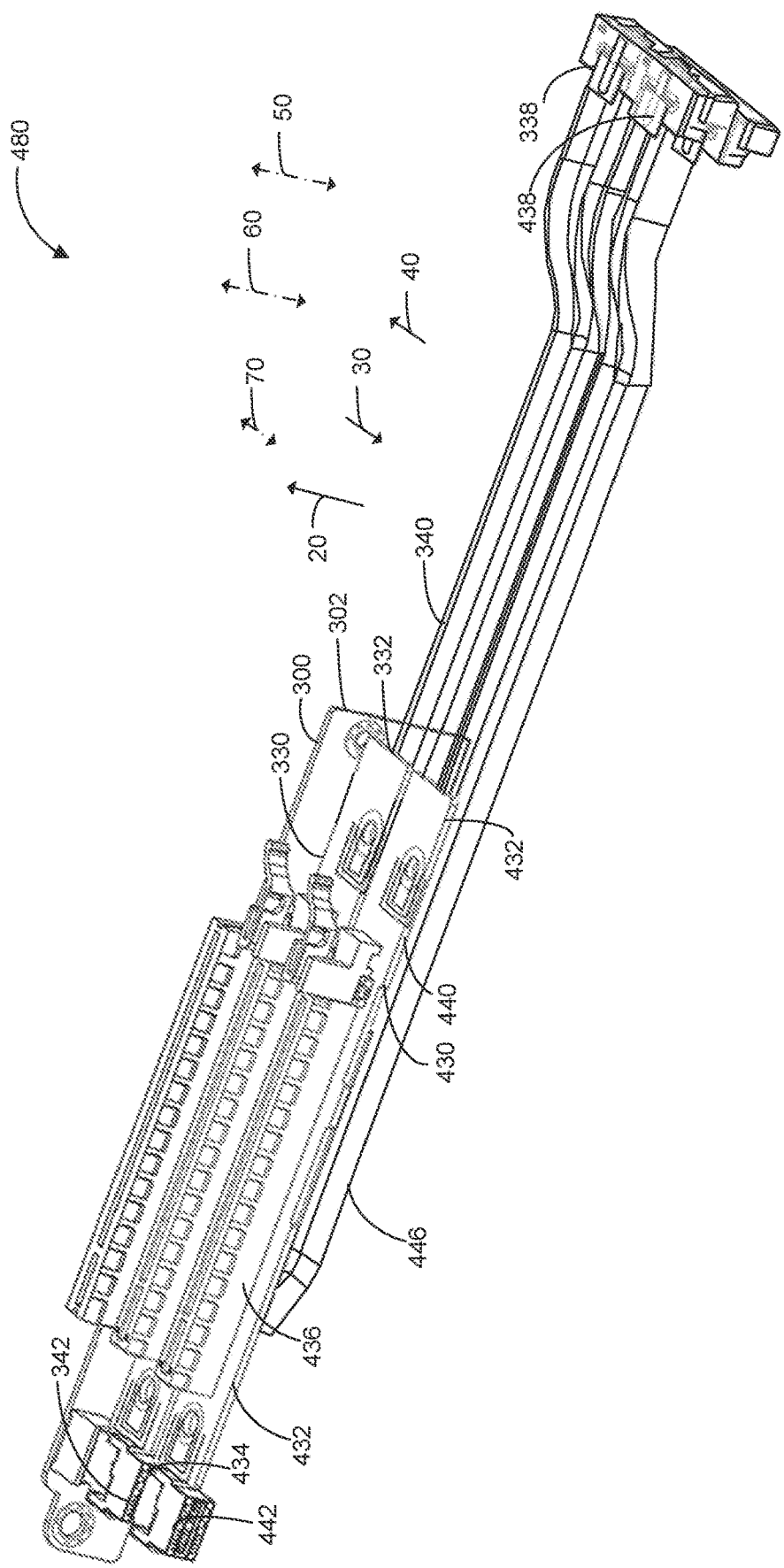
FIG. 4C illustrates an assembled perspective view of the riser assembly of FIG. 4B additionally having a second stackable secondary riser card according to an example of the present disclosure.

FIG. 4C illustrates an assembled perspective view of the riser assembly 480 of FIG. 4B additionally having a second stackable secondary riser card 430. In some examples, the second stackable secondary riser card 430 is similar to the stackable secondary riser card 330. Therefore, the second stackable secondary riser card 430 is not discussed in greater detail herein. The second stackable secondary riser card 430 includes another secondary circuit board 432, another third complementary electrical connector 434, another fourth electrical connector 436, another fifth electrical connector 438, another cable 440, and another sixth electrical connector 442.

In some examples, the second stackable secondary riser card 430 is oriented to extend horizontally such that the other secondary circuit board 432 is positioned parallel to the secondary circuit board 332 or is perpendicular to the circuit board 302 of the riser card 300. In such examples, the other third complementary electrical connector 434 may be positioned adjacent to the sixth electrical connector 342 of the stackable secondary riser card 330 and the other sixth electrical connector 442 is positioned away from the sixth electrical connector 342. In particular, the other third complementary electrical connector 434 is oriented to extend horizontally along the fourth direction 40 opposite to the third direction 30, and the other sixth electrical connector 442 is also oriented to extend horizontally along the third direction 30. Further, the other fourth electrical connector 436 is oriented to extend vertically along the second direction 20. The other fifth electrical connector 438 is electrically connected to the other fourth electrical connector 436 via the other cable 440.

In some examples, the second stackable secondary riser card 430 is stacked on the stackable secondary riser card 330 such that the other third complementary electrical connector 434 of the second stackable secondary riser card 430 mates with the sixth electrical connector 342 of the stackable secondary riser card 330. In such examples, the mating occurs by the motion of the other third complementary electrical connector 434 along a third mating axis 70 perpendicular to the first or second mating axes 50, 60. In some examples, the other fourth electrical connector 436 may be configured to mate with a seventh complementary electrical connector of a third expansion card (not shown) positioned above the other secondary circuit board 432. In such examples, the mating may occur by the motion of the seventh complementary electrical connector of the third expansion card along the second mating axis 60 parallel to the first mating axis 50. Further, the other fifth electrical connector 438 may be configured to mate with another fifth complementary electrical connector of the primary system board and electrically connect the other fifth complementary electrical connector with the other fourth electrical connector 436 via the other cable 440 and the other fifth electrical connector 438. In some examples, the other sixth electrical connector 442 may be configured to mate with yet another third complementary electrical connector of a third stackable secondary riser card (not shown). In such examples, yet another secondary circuit board of the third stackable secondary riser card may be oriented to extend parallel to the other secondary circuit board 332 of the second stackable secondary riser card 430 and the mating may occur by the motion of the yet other third complementary electrical connector along a third mating axis 70 perpendicular to the first or second mating axes 50, 60.

FIG. 5A depicts a perspective view of a portion of an information processing device 500 including a chassis 502 and a primary system board 504. The chassis 502 may be an enclosure formed by a base 506, a pair of peripheral sidewalls, a cover, a rear panel, and a front panel. It may be noted herein that only the base 506 is shown in FIG. 5A for ease of illustration of other electronic components of the information processing device 500. The primary system board 504 is mounted on the base 506. In some examples, the primary system board 504 is a host processor module. The primary system board 504 includes a first complementary electrical connector 518, a fifth complementary electrical connector 520, and another fifth complementary electrical connector 520A. In some examples, the first complementary electrical connector 518 is a modular extensible input output connector (M-XIO connector) and each of the fifth complementary electrical connectors 520, 520A is a modular extensible input output socket.

Figure 5B:
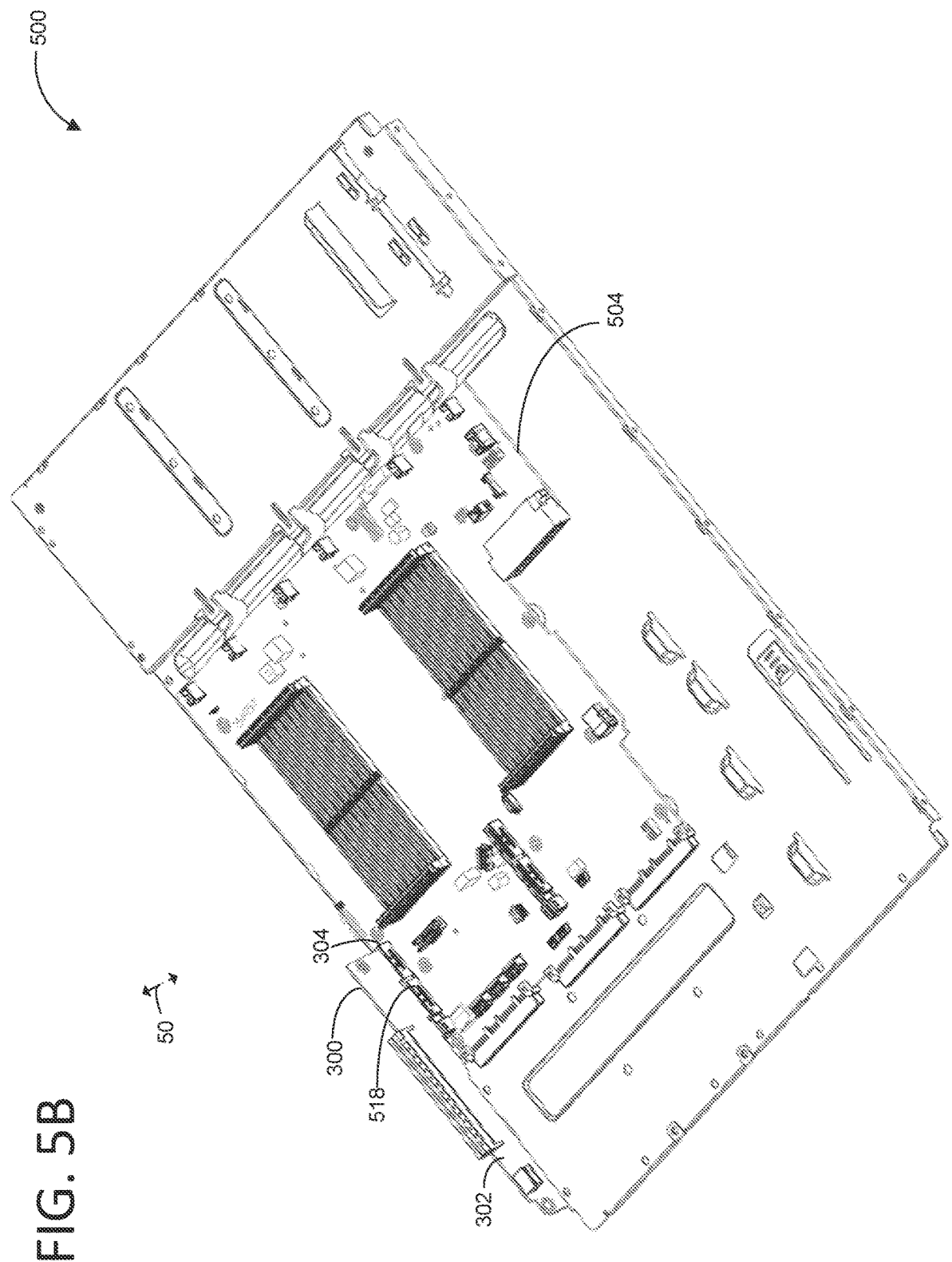
FIG. 5B illustrates a perspective view of a portion of the information processing device of FIG. 5A having a riser card of FIG. 4A according to an example of the present disclosure.

FIG. 5B depicts a perspective view of a portion of an information processing device 500 of FIG. 5A including a riser card 300 of FIG. 3A. The riser card 300 is mounted on the primary system board 504 such that the first electrical connector 304 is detachably connected to the first complementary electrical connector 518 of the primary system board 504 with the circuit board 302 perpendicular to the primary system board 504. In other words, the riser card 300 is mounted on the primary system board 504 positioned below the circuit board 302 such that the first electrical connector 304 positioned at a bottom edge of the circuit board 302 mates with the first complementary electrical connector 518. In such examples, the mating occurs by a motion of the first electrical connector 304 along a first mating axis 50 parallel to the circuit board 302. Accordingly, the first electrical connector 304 receives power signals, data signals, and sideband signals from the first complementary electrical connector 518.

Figure 5C:
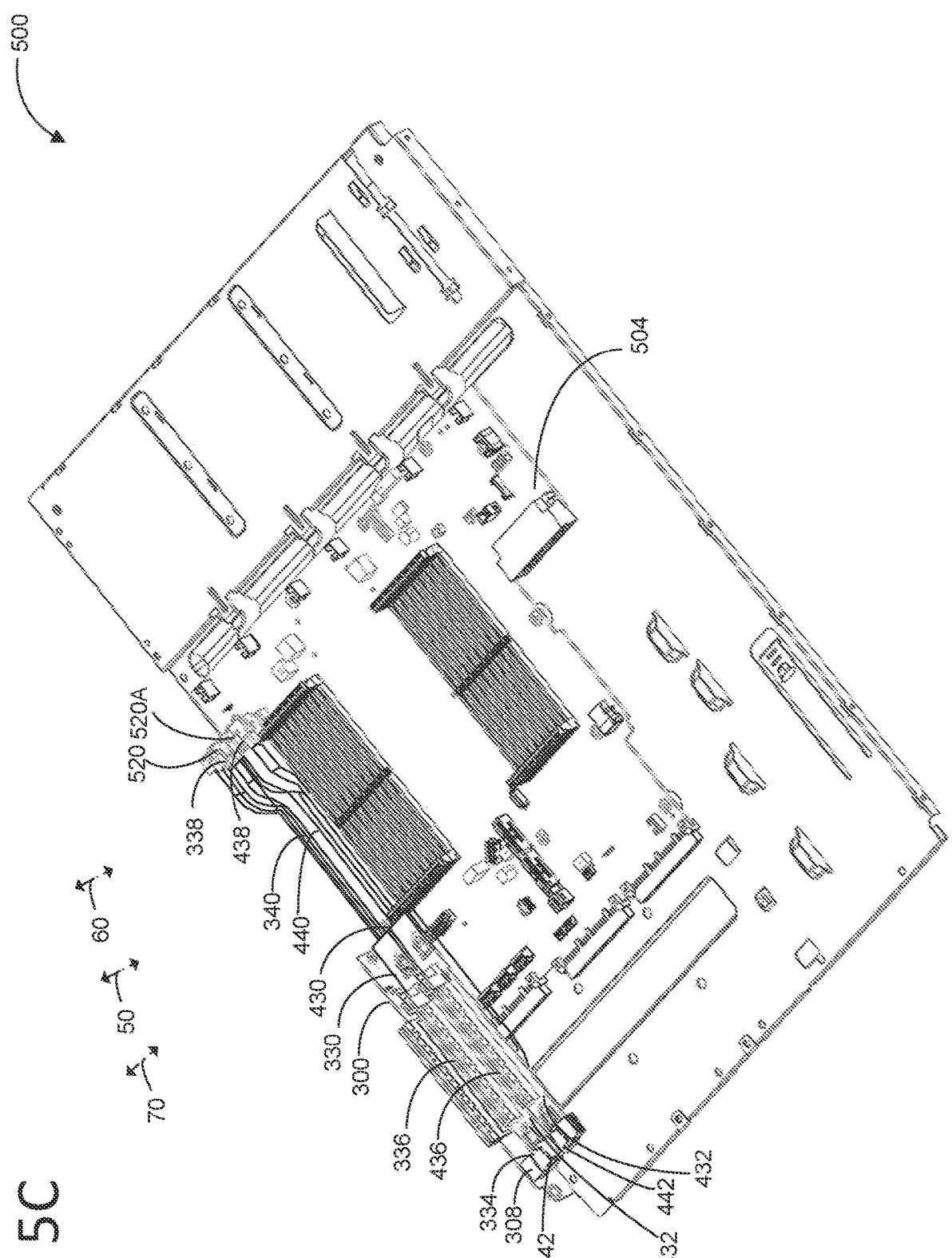
FIG. 5C illustrates a perspective view of a portion of the information processing device of FIG. 5B having a stackable secondary riser card of FIGS. 4A-4B and a second stackable secondary riser card of FIG. 4C according to an example of the present disclosure.

FIG. 5C depicts a perspective view of a portion of the information processing device 500 of FIG. 5B having a second stackable secondary riser card 430 of FIGS. 4A-4B and a second stackable secondary riser card 430 of FIG. 4C.

In some examples, the stackable secondary riser card 330 is oriented to extend horizontally such that the secondary circuit board 332 is positioned perpendicular to the circuit board 302. As discussed herein in the example of FIGS. 4B-4C, the stackable secondary riser card 330 is later stacked on the riser card 300 such that the third complementary electrical connector 334 of the stackable secondary riser card 330 mates with the third electrical connector 308 of the riser card 300. In such examples, the mating occurs by the motion of the third complementary electrical connector 334 along a third mating axis 70 perpendicular to the first or second mating axes 50, 60. Further, the fifth electrical connector 338 mates with the fifth complementary electrical connector 520 of the primary system board 504 and electrically connect the fifth complementary electrical connector 520 with the fourth electrical connector 336 via the cable 340 and the fifth electrical connector 338.

In some examples, the second stackable secondary riser card 430 is oriented to extend horizontally such that the other secondary circuit board 432 is positioned parallel to the secondary circuit board 332 or is perpendicular to the circuit board 302 of the riser card 300. As discussed herein in the example of FIGS. 4B-4C, the second stackable secondary riser card 430 is later stacked on the stackable secondary riser card 330 such that the other third comple-mentary electrical connector 434 of the second stackable secondary riser card 430 mates with the sixth electrical connector 342 of the stackable secondary riser card 330. In such examples, the mating occurs by the motion of the other third complementary electrical connector 434 along the third mating axis 70 perpendicular to the first or second mating axes 50, 60. Further, the other fifth electrical connector 438 mates with the other fifth complementary electrical connector 520A of the primary system board 504 and electrically connect the other fifth complementary electrical connector 520A with the other fourth electrical connector 436 via the other cable 440 and the other fifth electrical connector 438.

Figure 5D:
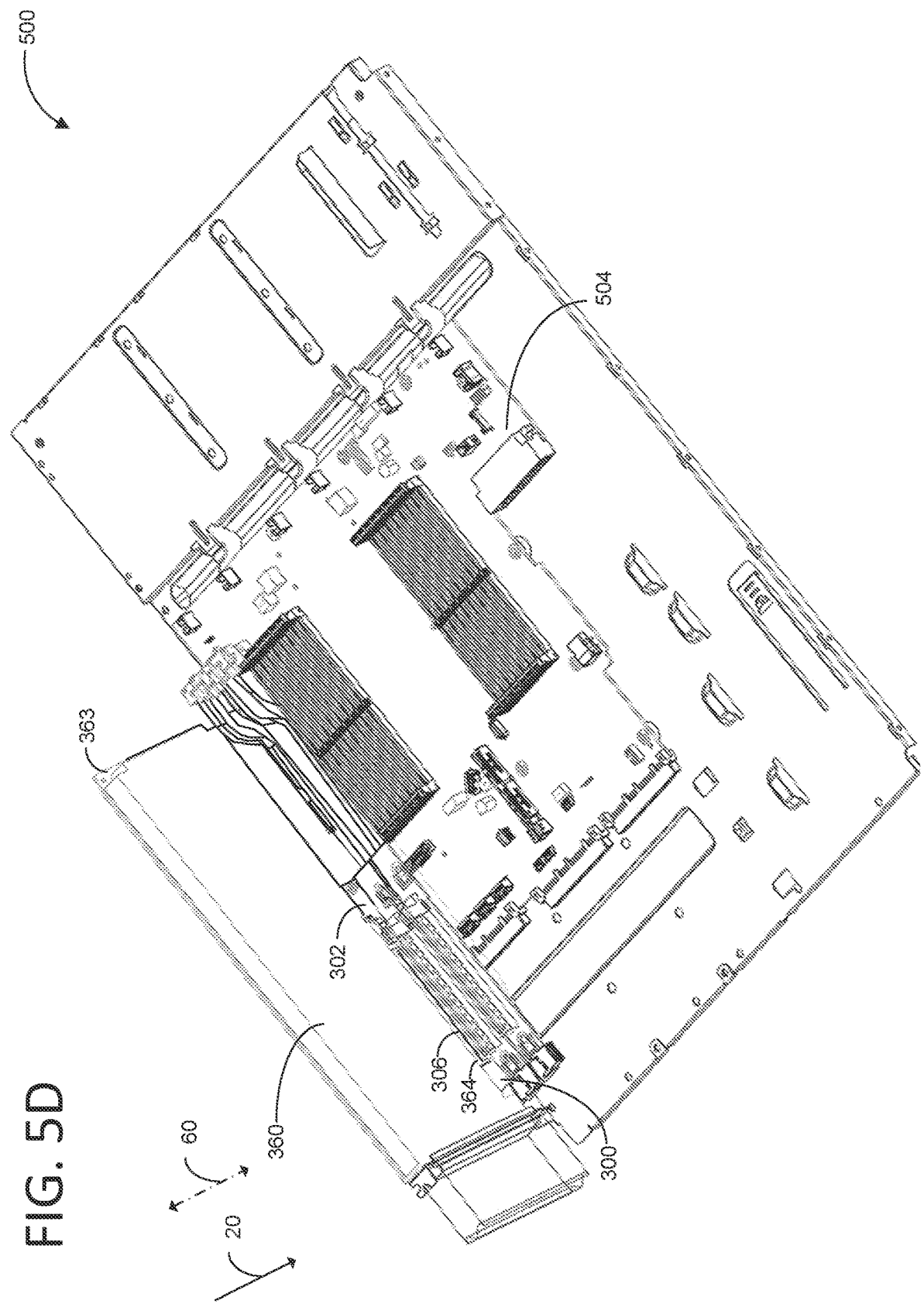
FIG. 5D illustrates a perspective view of a portion of the information processing device of FIG. 5C having an expansion card of FIG. 3D detachably connected to the riser card of FIG. 4A according to an example of the present disclosure.

FIG. 5D depicts a perspective view of a portion of the information processing device 500 of FIG. 5C having an expansion card 360 of FIG. 3D detachably connected to the riser card 300 of FIG. 4A.

In some examples, the second electrical connector 306 of the riser card 300 is configured to mate with the second complementary electrical connector 364 of the expansion card 360 positioned above the circuit board 302. For example, the expansion card 360 is oriented to extend perpendicular along a second direction 20 such that the circuit board 363 of the expansion card 360 is oriented perpendicular to the primary system board 504 or parallel to the circuit board 302 of the riser card 300. Later, the expansion card 360 is mounted on the riser card 300 such that the second complementary electrical connector 364 of the expansion card 360 mates with the second electrical connector 306. In such examples, the mating of the second complementary electrical connector 364 with the second electrical connector 306 occurs by the motion of the expansion card 360 along a second mating axis 60 parallel to the first mating axis 50.

Figure 5E:
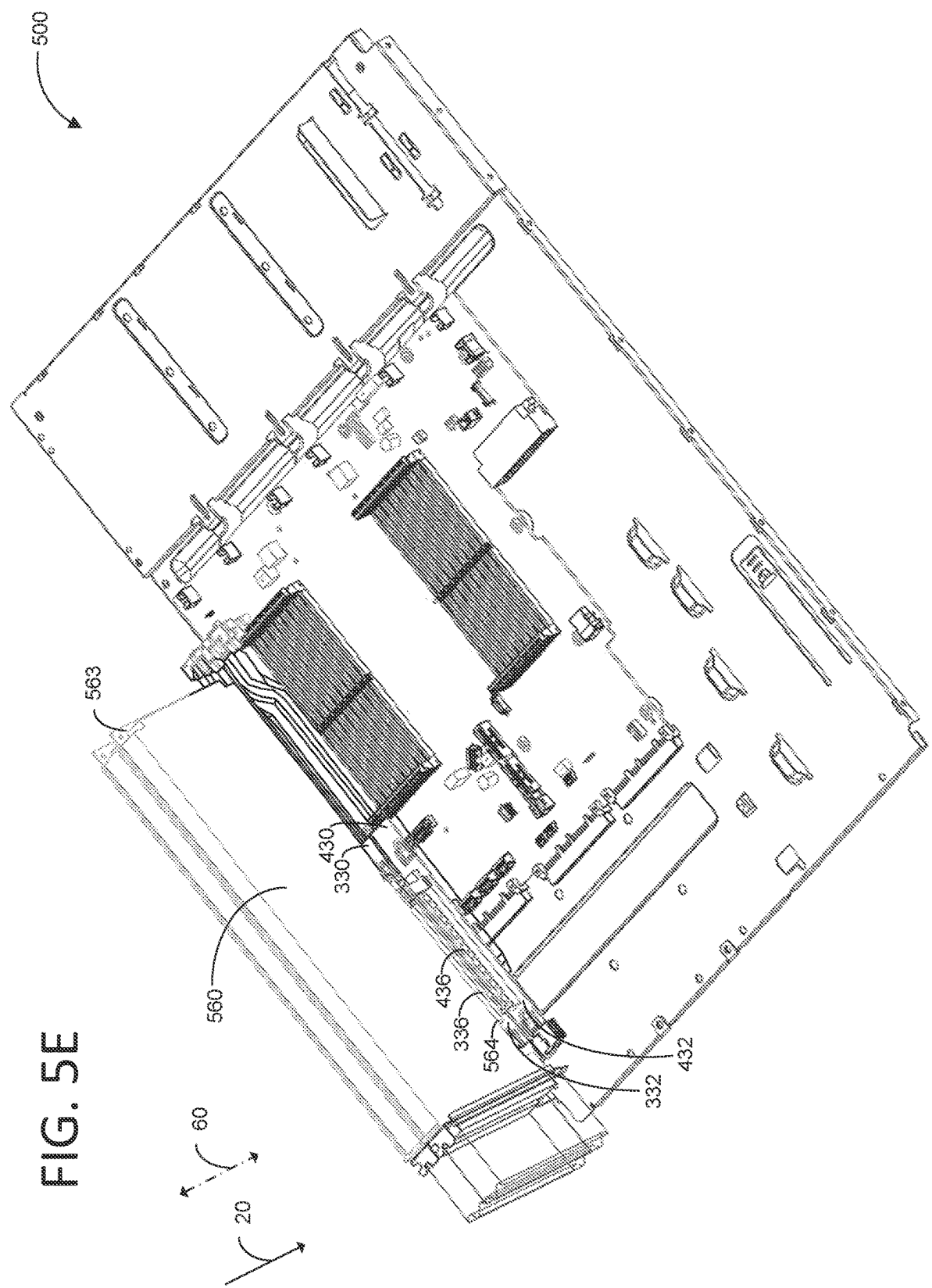
FIG. 5E illustrates a perspective view of a portion of the information processing device of FIG. 5D having a second expansion card detachably connected to the second stackable secondary riser card of FIG. 4C according to an example of the present disclosure.

FIG. 5E depicts a perspective view of a portion of the information processing device 500 of FIG. 5D having a second expansion card 560 detachably connected to the second stackable secondary riser card 430 of FIG. 4C. The second expansion card 560 is similar to the expansion card 360 and hence the second expansion card 560 is not discussed in detail herein.

In some examples, the fourth electrical connector 336 of the stackable secondary riser card 330 is configured to mate with a fourth complementary electrical connector 564 of the second expansion card 560 positioned above the secondary circuit board 332 of the stackable secondary riser card 330. For example, the second expansion card 560 is oriented to extend perpendicular along the second direction 20 such that a circuit board 563 of the second expansion card 560 is oriented perpendicular to the primary system board 504 or the secondary circuit board 332 or parallel to the circuit board 302 of the riser card 300. Later, the second expansion card 560 is mounted on the stackable secondary riser card 330 such that the fourth complementary electrical connector 564 of the second expansion card 560 mates with the fourth electrical connector 336. In such examples, the mating of the fourth complementary electrical connector 564 with the fourth electrical connector 336 occurs by the motion of the second expansion card 560 along a second mating axis 60 parallel to the first mating axis 50.

Even though not illustrated, in some examples, a third expansion card (not shown) may be mounted on the second stackable secondary riser card 430 such that a seventh complementary electrical connector of the third expansion card positioned above other secondary circuit board 432 mates with the other fourth electrical connector 436. In such examples, the mating may occur by the motion of the seventh complementary electrical connector of the third expansion card along the second mating axis 60 parallel to the first mating axis 50.

Figure 6:
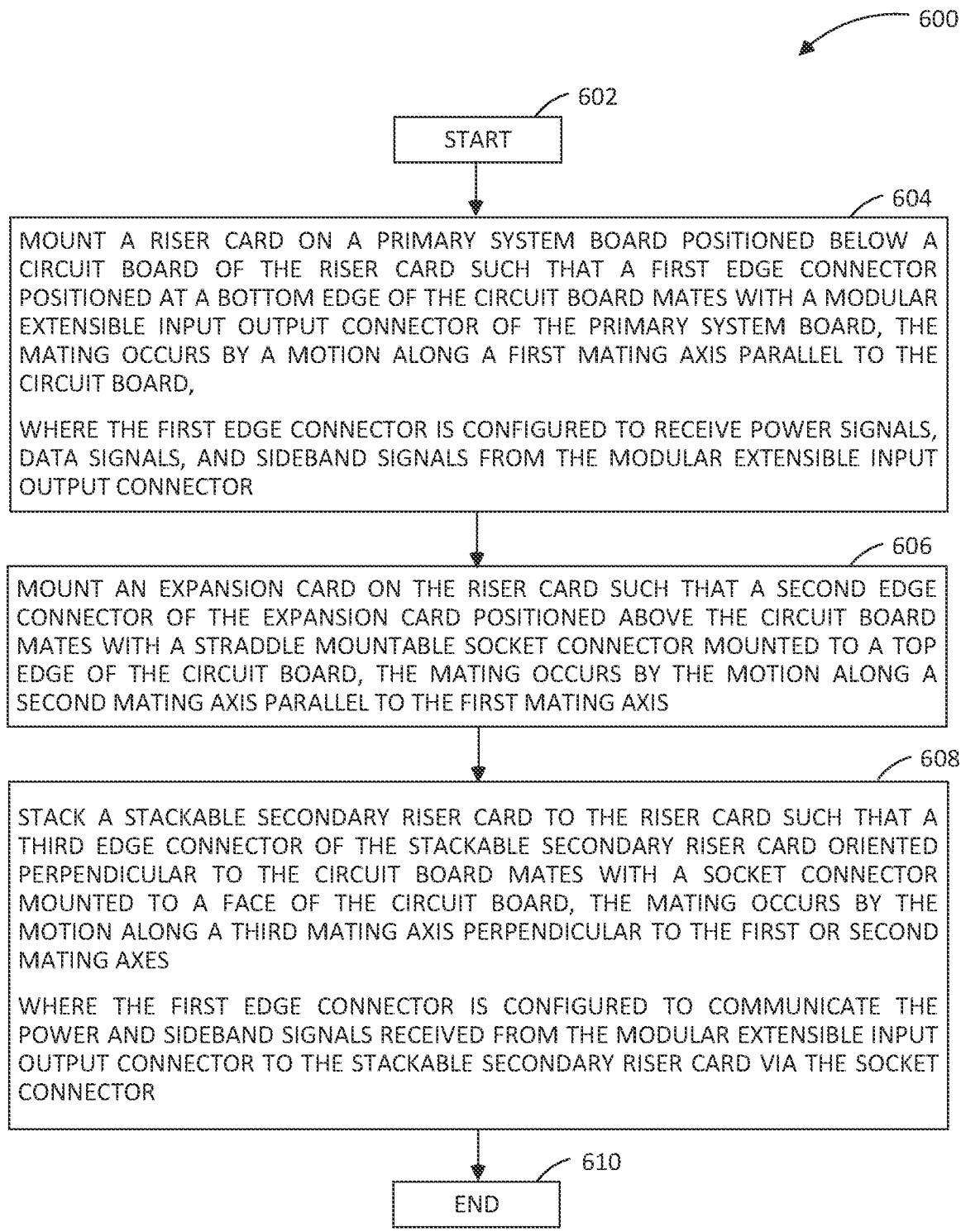
FIG. 6 is a flowchart depicting a method of installing a riser card assembly in an information processing device according to an example of the present disclosure.

FIG. 6 depicts a flow depicting a method 600 of installing a riser card assembly in an information processing device. It may be noted herein that the method 600 is described in conjunction with FIGS. 3A-3D, 4A-4C, and 5A-5E for example. The method 600 starts at block 602 and continues to block 604.

At block 604, the method 600 includes mounting a riser card on a primary system board positioned below a circuit board of the riser card such that a first edge connector (or a first electrical connector) positioned at a bottom edge of the circuit board mates with a modular extensible input output connector (or a first complementary electrical connector) of the primary system board. In such examples, the mating of the first edge connector with the modular extensible input output connector occurs by a motion of the first edge connector along a first mating axis parallel to the circuit board. Accordingly, the first edge connector of the riser card may receive power signals, data signals, and sideband signals from the modular extensible input output connector. The method 600 continues to block 606.

At block 606, the method 600 includes mounting an expansion card on the riser card such that a second edge connector (or a second electrical connector) of the expansion card positioned above the circuit board mates with a straddle mountable socket connector (or a second complementary electrical connector) mounted to a top edge of the circuit board. In such examples, the mating of the second edge connector with the straddle mountable socket connector occurs by the motion of the second edge connector along a second mating axis parallel to the first mating axis. The method 600 continues to block 608.

At block 608, the method 600 includes stacking a stackable secondary riser card to the riser card such that a third edge connector (or a third complementary electrical connector) of the stackable secondary riser card oriented perpendicular to the circuit board mates with a socket connector (or a third electrical connector) mounted to a face of the circuit board. In such examples, the mating of the third edge connector with the socket connector occurs by the motion of the third edge connector along a third mating axis perpendicular to the first or second mating axes. Accordingly, the first edge connector is configured to communicate the power and sideband signals received from the modular extensible input output connector to the stackable secondary riser card via the socket connector.

The method 600 further includes stacking a second stackable secondary riser card to the stackable secondary riser card such that another third edge connector (or another third complementary electrical connector) of the second stackable secondary riser card oriented parallel to a secondary circuit board of the stackable secondary riser card mates with another socket connector (or another third connector) positioned at a peripheral edge of the stackable secondary riser card. In such examples, the mating of the other third edge connector with the other socket connector occurs by the motion of the other third edge connector along the third mating axis perpendicular to the first or second mating axes. Accordingly, the third edge connector of the stackable secondary riser card is configured to communicate the power and sideband signals to the second stackable secondary riser card via the other socket connector. The method 600 ends at block 610.

In the foregoing description, numerous details are set forth to provide an understanding of the subject matter disclosed herein. However, implementation may be practiced without some or all these details. Other implementations may include modifications, combinations, and variations from the details discussed above. It is intended that the following claims cover such modifications and variations.

What is claimed is:

1. A riser card comprising:
   a circuit board;
   a first electrical connector positioned at a bottom edge of the circuit board;
   a second electrical connector positioned at a top edge of the circuit board; and
   a third electrical connector mounted to a face of the circuit board,
   wherein the riser card is configured to be mounted on a primary system board of an information processing device, such that:
      the first electrical connector is detachably connected to a first complementary electrical connector of the primary system board with the circuit board perpendicular to the primary system board, such that the first electrical connector receives power signals, data signals, and sideband signals from the first complementary electrical connector;
      the second electrical connector is configured to mate with a second complementary electrical connector of an expansion card oriented parallel to the circuit board; and
      the third electrical connector is configured to mate with a third complementary electrical connector of a first stackable secondary riser card of one or more stackable secondary riser cards oriented perpendicular to the circuit board such that the power and sideband signals received by the first electrical connector are communicated to the first stackable secondary riser card via the third electrical connector.

2. The riser card of claim 1, wherein the riser card is a peripheral card, and wherein the expansion card is a PCI-e expansion card.

3. The riser card of claim 1, wherein the first electrical connector is a first edge connector, the second electrical connector is a straddle mountable socket connector, the third electrical connector is a first socket connector, the first complementary electrical connector is a modular extensible input output connector, the second complementary electrical connector is a first PCI-e edge connector, and the third complementary electrical connector is a second edge connector.

4. A riser assembly comprising the riser card of claim 1 and a riser cage configured to removably install the riser card in a chassis of the information processing device.

5. A riser assembly comprising the riser card of claim 1 and the one or more stackable secondary riser cards, wherein each of the stackable secondary riser cards comprises:
   a secondary circuit board;
   the third complementary electrical connector positioned at a first peripheral edge of the secondary circuit board;
   a fourth electrical connector mounted to a face of the secondary circuit board;
   a fifth electrical connector connected to a cable comprising a free end electrically connected to the fourth electrical connector; and
   a sixth electrical connector positioned at a second peripheral edge opposite to the first peripheral edge of the secondary circuit board.

6. The riser assembly of claim 5, wherein the first stackable secondary riser card of the one or more stackable secondary riser cards is configured to be stacked to the riser card such that:
  the third complementary electrical connector is detachably connected to the third electrical connector with the secondary circuit board perpendicular to the circuit board, such that the third complementary electrical connector receives the power and sideband signals from the third electrical connector;
  the fourth electrical connector is configured to mate with a fourth complementary electrical connector of a second expansion card oriented perpendicular to the secondary circuit board; and
  the fifth electrical connector is configured to mate with a fifth complementary electrical connector of the primary system board such that the fifth electrical connector receives the data signals from the fifth complementary electrical connector via the cable.

7. The riser assembly of claim 6, wherein a second stackable secondary riser card of the one or more stackable secondary riser cards is configured to be stacked to the first stackable secondary riser card such that:
  another third complementary electrical connector of the second stackable secondary riser card is detachably connected to the sixth electrical connector of the first stackable secondary riser card with another secondary circuit board of the second stackable secondary riser card parallel to the secondary circuit board of the first stackable secondary riser card, such that the other third complementary electrical connector receives the power and sideband signals from the sixth electrical connector;
  another fourth electrical connector of the second stackable secondary riser card is configured to mate with seventh complementary electrical connector of a third expansion card oriented perpendicular to the other secondary circuit board of the second stackable secondary riser card; and
  another fifth electrical connector of the second stackable secondary riser card is configured to mate with another fifth complementary electrical connector of the primary system board such that the other fifth electrical connector receives the data signals from the other fifth complementary electrical connector via another cable.

8. The riser assembly of claim 6, wherein the fourth electrical connector is a second socket connector, the fifth electrical connector is a modular extensible input output plug, the sixth electrical connector is a third socket connector, the third complementary electrical connector is a second edge connector, the fourth complementary electrical connector is a second PCI-e edge connector, and the fifth complementary electrical connector is a modular extensible input output socket.

9. The riser assembly of claim 6, wherein each of the riser card and the stackable secondary riser card is configured to electrically connect with a corresponding expansion card having at least 4 Unit Space (Uspace) height.

10. An information processing device comprising:
  a chassis;
  a primary system board horizontally oriented and coupled to the chassis; and
  a riser assembly comprising a riser card and a riser cage coupling the riser card to the chassis, the riser card comprising:
    a circuit board;
    a first electrical connector positioned at a bottom edge of the circuit board;
    a second electrical connector positioned at a top edge of the circuit board; and
    third electrical connector mounted to a face of the circuit board,
    wherein the riser card is mounted on the primary system board such that:
    the first electrical connector is detachably connected to a first complementary electrical connector of the primary system board with the circuit board perpendicular to the primary system board, such that the first electrical connector receives power signals, data signals, and sideband signals from the first complementary electrical connector,
    the second electrical connector is configured to mate with a second complementary electrical connector of an expansion card oriented parallel to the circuit board, and
    the third electrical connector is configured to mate with a third complementary electrical connector of a first stackable secondary riser card of one or more stackable secondary riser cards oriented perpendicular to the circuit board such that the power and sideband signals received by the first electrical connector are communicated to the first stackable secondary riser card via the third electrical connector.

11. The information processing device of claim 10, wherein the riser card is a peripheral card, and wherein the expansion card is a PCI-e expansion card.

12. The information processing device of claim 10, wherein the first electrical connector is a first edge connector, the second electrical connector is a straddle mountable socket connector, the third electrical connector is a first socket connector, the first complementary electrical connector is a modular extensible input output connector, the second complementary electrical connector is a first PCI-e edge connector, and the third complementary electrical connector is second edge connector.

13. The information processing device of claim 10, wherein each of the stackable secondary riser cards comprises:
  a secondary circuit board;
  the third complementary electrical connector positioned at a first peripheral edge of the secondary circuit board;
  a fourth electrical connector mounted to a face of the secondary circuit board;
  a fifth electrical connector connected to a cable comprising a free end electrically connected to the fourth electrical connector; and
  a sixth electrical connector positioned at a second peripheral edge opposite to the first peripheral edge of the secondary circuit board.

14. The information processing device of claim 13, wherein the first stackable secondary riser card of the one or more stackable secondary riser cards is configured to be stacked to the riser card such that:
  the third complementary electrical connector is detachably connected to the third electrical connector with the secondary circuit board perpendicular to the circuit board, such that the third complementary electrical connector receives the power and sideband signals from the third electrical connector;
  the fourth electrical connector is configured to mate with a fourth complementary electrical connector of a second expansion card oriented perpendicular to the secondary circuit board; and the fifth electrical connector is configured to mate with a fifth complementary electrical connector of the primary system board such that the fifth electrical connector receives the data signals from the fifth complementary electrical connector via the cable.

15. The information processing device of claim 14, wherein a second stackable secondary riser card of the stackable secondary riser cards is configured to be stacked to the first stackable secondary riser card such that:
   another third complementary electrical connector of the second stackable secondary riser card is detachably connected to the sixth electrical connector of the first stackable secondary riser card with another secondary circuit board of the second stackable secondary riser card parallel to the secondary circuit board of the first stackable secondary riser card, such that the other third complementary electrical connector receives the power and sideband signals from the sixth electrical connector;
   another fourth electrical connector of the second stackable secondary riser card is configured to mate with seventh complementary electrical connector of a third expansion card oriented perpendicular to the other secondary circuit board of the second stackable secondary riser card; and
   another fifth electrical connector of the second stackable secondary riser card is configured to mate with another fifth complementary electrical connector of the primary system board such that the other fifth electrical connector receives the data signals from the other fifth complementary electrical connector via another cable.

16. The information processing device of claim 14, wherein the fourth electrical connector is a second socket connector, the fifth electrical connector is a modular extensible input output plug, the sixth electrical connector is a third socket connector, the third complementary electrical connector is a second edge connector, the fourth complementary electrical connector is a second PCI-e edge connector, and the fifth complementary electrical connector is a modular extensible input output socket.

17. The information processing device of claim 10, wherein each of the riser card and the stackable secondary riser card is configured to electrically connect with a corresponding expansion card having at least 4 Unit Space (Uspace) height.

18. The information processing device of claim 10, further comprising the expansion card oriented parallel to the circuit board and with a second complementary electrical connector thereof mating with the second electrical connector of the riser card.

19. A method comprising:
   mounting a riser card on a primary system board positioned below a circuit board of the riser card such that a first edge connector positioned at a bottom edge of the circuit board mates with a modular extensible input output connector of the primary system board, the mating occurs by a motion along a first mating axis parallel to the circuit board,
   wherein the first edge connector is configured to receive power signals, data signals, and sideband signals from the modular extensible input output connector;
   mounting an expansion card on the riser card such that a second edge connector of the expansion card positioned above the circuit board mates with a straddle mountable socket connector mounted to a top edge of the circuit board, the mating occurs by the motion along a second mating axis parallel to the first mating axis; and
   stacking a stackable secondary riser card to the riser card such that a third edge connector of the stackable secondary riser card oriented perpendicular to the circuit board mates with a socket connector mounted to a face of the circuit board, the mating occurs by the motion along a third mating axis perpendicular to first or second mating axes,
   wherein the first edge connector is configured to communicate the power and sideband signals received from the modular extensible input output connector to the stackable secondary riser card via the socket connector.

20. The method of claim 19, further comprising:
   stacking a second stackable secondary riser card to the stackable secondary riser card such that another third edge connector of the second stackable secondary riser card oriented parallel to a secondary circuit board of the stackable secondary riser card mates with a socket connector positioned at a peripheral edge of the stackable secondary riser card, the mating occurs by the motion along the third mating axis.

* * * * *